(12) United States Patent
Kim et al.

(10) Patent No.: US 9,479,304 B2
(45) Date of Patent: Oct. 25, 2016

(54) METHOD FOR TRANSCEIVING REFERENCE SIGNAL IN WIRELESS ACCESS SYSTEM AND TERMINAL THEREFOR

(75) Inventors: Jinmin Kim, Anyang-si (KR);
Seunghee Han, Anyang-si (KR);
Hyunwoo Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 72 days.

(21) Appl. No.: 14/113,358

(22) PCT Filed: Apr. 25, 2012

(86) PCT No.: PCT/KR2012/003179
§ 371 (c)(1),
(2), (4) Date: Oct. 22, 2013

(87) PCT Pub. No.: WO2012/148162
PCT Pub. Date: Nov. 1, 2012

(65) Prior Publication Data
US 2014/0192729 A1    Jul. 10, 2014

Related U.S. Application Data

(60) Provisional application No. 61/478,900, filed on Apr. 25, 2011.

(51) Int. Cl.
*H04L 5/00* (2006.01)

(52) U.S. Cl.
CPC ............. *H04L 5/0048* (2013.01); *H04L 5/001* (2013.01); *H04L 5/0042* (2013.01); *H04L 5/0051* (2013.01)

(58) Field of Classification Search
CPC .................................................... H04L 5/0048
USPC ...... 370/329, 311, 252, 328; 455/7; 375/299
See application file for complete search history.

(56) References Cited

U.S. PATENT DOCUMENTS

| | | | |
|---|---|---|---|
| 2007/0171808 A1* | 7/2007 | Wu | H04B 7/0452 370/208 |
| 2008/0240269 A1* | 10/2008 | Pajukoski | H04J 13/0003 375/260 |
| 2009/0046582 A1* | 2/2009 | Sarkar | H04B 7/043 370/230.1 |

(Continued)

FOREIGN PATENT DOCUMENTS

| | | |
|---|---|---|
| KR | 10-2010-0058398 A | 6/2010 |
| WO | WO 2010/123287 A2 | 10/2010 |

OTHER PUBLICATIONS

Ericsson et al., "Further Considerations on Uplink Reference Signals for Frame Structure Type 2," TSG-RAN WG1 #49bis, Agenda Item 5.11.2, R1-073047, Jun. 21-25, 2007, Orlando, 6 pages.

(Continued)

*Primary Examiner* — Parth Patel
(74) *Attorney, Agent, or Firm* — Birch, Stewart, Kolasch & Birch, LLP

(57) ABSTRACT

Disclosed are a method for transceiving reference signals in a wireless access system supporting carrier aggregation and a terminal therefor. Specifically, the method comprising the steps of: generating a beacon reference signal for estimating an uplink channel using an uplink reference signal; inserting the generated beacon reference signal into the last symbol of a subframe in an uplink frequency region; and transmitting the inserted beacon reference signal to a base station using a subframe that is equivalent to a demodulation reference signal.

8 Claims, 14 Drawing Sheets

(56) References Cited

U.S. PATENT DOCUMENTS

| | | | |
|---|---|---|---|
| 2009/0073922 A1* | 3/2009 | Malladi | H04L 1/0004 370/328 |
| 2009/0141701 A1* | 6/2009 | Dalsgaard | H04B 7/2681 370/350 |
| 2010/0054147 A1* | 3/2010 | Ishii | H04L 1/1671 370/252 |
| 2010/0056197 A1* | 3/2010 | Attar | H04L 1/0026 455/522 |
| 2010/0067591 A1* | 3/2010 | Luo | H04L 1/0025 375/260 |
| 2010/0165930 A1* | 7/2010 | Zangi | H04L 5/0007 370/329 |
| 2010/0246561 A1 | 9/2010 | Shin et al. | |
| 2010/0272048 A1 | 10/2010 | Pan et al. | |
| 2011/0038271 A1* | 2/2011 | Shin et al. | 370/252 |
| 2011/0086644 A1* | 4/2011 | Dahlman | H04W 72/042 455/450 |
| 2011/0110261 A1* | 5/2011 | Frenger | H04B 7/15542 370/252 |
| 2011/0110307 A1* | 5/2011 | Ko | H04B 7/0069 370/328 |
| 2011/0129033 A1* | 6/2011 | Dai et al. | 375/299 |
| 2011/0142076 A1* | 6/2011 | Ko | H04L 1/0625 370/480 |
| 2011/0176480 A1* | 7/2011 | Dahlman | H04L 5/0051 370/328 |
| 2011/0199986 A1* | 8/2011 | Fong | H04L 5/0035 370/329 |
| 2011/0222588 A1* | 9/2011 | Ko | H04B 7/0689 375/135 |
| 2011/0228722 A1* | 9/2011 | Noh | H04L 27/2605 370/315 |
| 2011/0243066 A1* | 10/2011 | Nayeb Nazar et al. | 370/328 |
| 2011/0268101 A1* | 11/2011 | Wang et al. | 370/344 |
| 2011/0269489 A1* | 11/2011 | Khoshnevis | H04L 25/0202 455/507 |
| 2011/0274063 A1* | 11/2011 | Li | H04L 5/001 370/329 |
| 2011/0305179 A1* | 12/2011 | Wang et al. | 370/311 |
| 2012/0008555 A1* | 1/2012 | Zhang et al. | 370/328 |
| 2012/0039298 A1 | 2/2012 | Lee et al. | |
| 2012/0044857 A1* | 2/2012 | Kim | H04B 7/15528 370/315 |
| 2012/0057535 A1* | 3/2012 | Zhang | H04W 72/0426 370/329 |
| 2012/0087334 A1* | 4/2012 | Suzuki | H04L 5/001 370/329 |
| 2012/0113831 A1* | 5/2012 | Pelletier et al. | 370/252 |
| 2012/0113908 A1* | 5/2012 | Jen | H04L 5/0053 370/329 |
| 2012/0170525 A1* | 7/2012 | Sorrentino | H04L 5/0007 370/329 |
| 2012/0182944 A1* | 7/2012 | Sorrentino | H04W 74/006 370/329 |
| 2012/0188889 A1* | 7/2012 | Sambhwani | H04B 7/0404 370/252 |
| 2012/0188958 A1* | 7/2012 | Suzuki | H04W 74/006 370/329 |
| 2012/0188961 A1* | 7/2012 | Suzuki | H04W 74/0833 370/329 |
| 2012/0202558 A1* | 8/2012 | Hedberg et al. | 455/550.1 |
| 2012/0294254 A1* | 11/2012 | Behravan et al. | 370/329 |
| 2012/0302158 A1* | 11/2012 | Horiuchi et al. | 455/7 |
| 2012/0327886 A1* | 12/2012 | Yu | H04W 72/042 370/329 |
| 2013/0039202 A1* | 2/2013 | Feuersanger | H04L 5/001 370/252 |
| 2013/0039203 A1* | 2/2013 | Fong | H04B 7/024 370/252 |
| 2013/0039305 A1* | 2/2013 | Kishiyama et al. | 370/329 |
| 2013/0044685 A1* | 2/2013 | Fong | H04J 11/0053 370/328 |
| 2013/0064168 A1* | 3/2013 | Song et al. | 370/315 |
| 2013/0100888 A1* | 4/2013 | Shimezawa | H04L 5/0053 370/328 |
| 2013/0170415 A1* | 7/2013 | Fukuta | H04W 52/0216 370/311 |
| 2013/0176924 A1* | 7/2013 | Kishiyama et al. | 370/311 |
| 2013/0182674 A1* | 7/2013 | Lunttila | H04L 5/001 370/329 |
| 2013/0201946 A1* | 8/2013 | Lunttila | H04W 24/02 370/329 |
| 2013/0229941 A1* | 9/2013 | Huang | H04B 7/0452 370/252 |
| 2014/0071909 A1* | 3/2014 | Frenne et al. | 370/329 |
| 2014/0092842 A1* | 4/2014 | Ahn et al. | 370/329 |
| 2014/0146777 A1* | 5/2014 | Shin | H04W 52/32 370/329 |

OTHER PUBLICATIONS

Texas Instruments, "High Speed Considerations for Frame Structure Type 2," 3GPP TSG RAN WG1 #51, Agenda Item 6.2.2, R1-074680, Nov. 5-9, 2007, Jeju, Korea, 3 pages.

* cited by examiner

FIG. 6
(a)
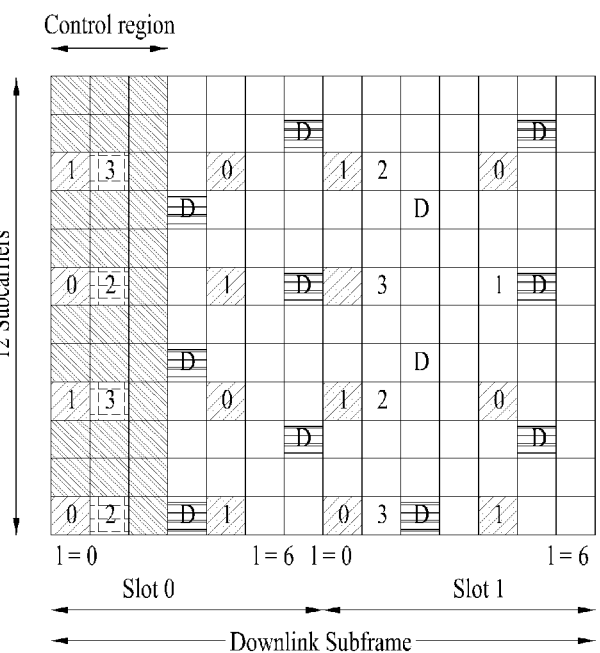
(b)
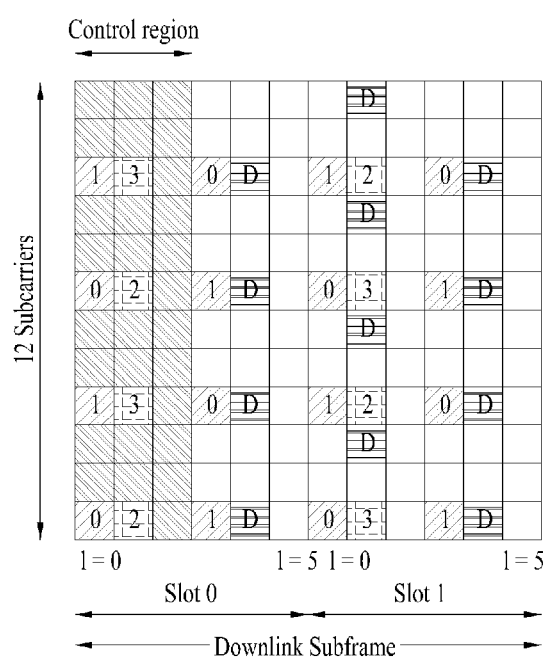

FIG. 9
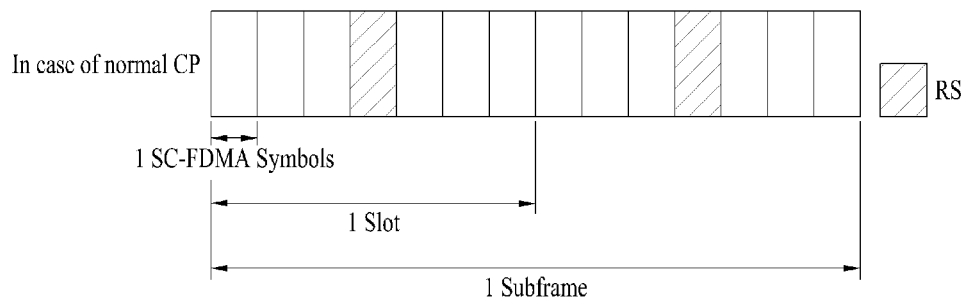
(a)
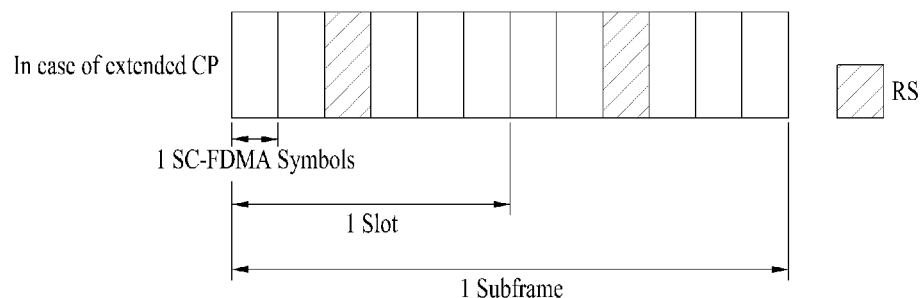
(b)

METHOD FOR TRANSCEIVING REFERENCE SIGNAL IN WIRELESS ACCESS SYSTEM AND TERMINAL THEREFOR

This application is the National Phase of PCT/KR2012/003179 filed on Apr. 25, 2012, which claims priority under 35 U.S.C. 119(e) to U.S. Provisional Application No. 61/478,900 filed on Apr. 25, 2011, all of which are hereby expressly incorporated by reference into the present application.

TECHNICAL FIELD

The present invention relates to a wireless access system, and more particularly, to a method of transmitting and receiving an uplink reference signal in a wireless access system that supports carrier aggregation, and a device for supporting the method.

BACKGROUND ART

One of most important requirements of a next generation wireless access system is to support high data transmission rate requirements. To this end, various technologies such as multiple input multiple output (MIMO), cooperative multiple point transmission (CoMP), a relay, etc. have been developed.

A conventional wireless access system considers only one carrier although bandwidths in uplink and downlink are set in different ways. For example, there is provided a wireless communication system in which the number of carriers included in each of uplink and downlink is one and bandwidths in uplink and downlink are generally symmetric, based on a single carrier.

However, in order to satisfy relatively high data transmission rate requirements to ensure a widebandwidth in consideration of an actual state in which frequency resources are saturated, the system is designed to satisfy basic requirements for operating independent systems in distributed bands and carrier aggregation (CA) whereby a plurality of bands is bonded to one system has been introduced.

Here, a carrier in a bandwidth unit in which independent operations are available may be referred to as a component carrier (CC). In order to increase transmission capacity, recent 3GPP LTE-A or 802.16m has continuously extended up to 20 MHz or more. In this case, one or more CCs are aggregated to support a wideband. For example, when one CC supports a bandwidth of 5 MHz, 10 MHz, or 20 MHz, a maximum of 5 CCs are bonded to support a system bandwidth up to a maximum of 100 MHz.

When CA technology is used, data can be simultaneously transmitted and received via various uplink/downlink CCs. Thus, a UE may monitor and measure all CCs.

DISCLOSURE

Technical Problem

An object of the present invention devised to solve the problem lies in a wireless access system, and preferably, a method of smoothly transmitting and receiving a reference signal between a base station and user equipment in a wireless access system that supports a carrier aggregation environment, and a device for the method.

In addition, another object of the present invention devised to solve the problem lies in a method of estimating/compensating accurate channel information of user equipment that moves at high speed, and a device for the method.

It is to be understood that both the foregoing general description and the following detailed description of the present invention are exemplary and explanatory and are intended to provide further explanation of the invention as claimed.

Technical Solution

The object of the present invention can be achieved by providing a method of transmitting an uplink reference signal in a wireless access system, the method including generating a beacon reference signal for estimating an uplink channel using an uplink reference signal, inserting the generated beacon reference signal into a last symbol of a subframe in an uplink frequency domain, and transmitting the inserted beacon reference signal to a base station via the same subframe as a demodulation reference signal.

In another aspect of the present invention, provided herein is a user equipment (UE) for transmitting an uplink reference signal in a wireless access system, the UE including a radio frequency (RF) unit, and a processor for generating a beacon reference signal for estimating an uplink channel using an uplink reference signal, inserting the generated beacon reference signal into a last symbol of a subframe in an uplink frequency domain, and transmitting the inserted beacon reference signal to a base station via the same subframe as a demodulation reference signal.

The uplink reference signal may include the demodulation reference signal or a sounding reference signal The uplink frequency domain may include a physical uplink shared channel (PUSCH) or physical uplink control channel (PUCCH) frequency domain.

The beacon reference signal may be generated using any one of a demodulation reference signal allocated to a first slot of one subframe and a demodulation reference signal allocated to a second slot of the subframe when the beacon reference signal is generated using the demodulation reference signal.

The beacon reference signal may be inserted by rate-matching or puncturing data resources allocated to the PUSCH frequency domain when the beacon reference signal is inserted into the PUSCH frequency domain.

The method may further include changing a position of a symbol in which the demodulation reference signal is transmitted.

The beacon reference signal may be inserted by configuring a bandwidth in which the sounding reference signal is transmitted so as to correspond to the PUSCH or PUCCH frequency domain when the beacon reference signal is generated using the sounding reference signal.

The beacon reference signal may be inserted by configuring the beacon reference signal such that a sounding reference signal having a smallest bandwidth of a resource block among sounding reference signals contains the PUSCH or PUCCH frequency domain when the beacon reference signal is generated using the sounding reference signal.

Advantageous Effects

According to embodiments of the present invention, a reference signal can be smoothly transmitted and received between a base station and user equipment in a wireless access system, particularly, in a wireless access system for supporting a carrier aggregation environment.

According to embodiments of the present invention, channel information can be accurately estimated/compensated with respect to user equipment that moves at high speed in a wireless access system for supporting a carrier aggregation environment, thereby achieving effective rank adaptation.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 6 is a diagram illustrating patterns in which RSs are mapped to a DL RB pair, as defined in a 3GPP LTE;

FIG. 9 is a diagram illustrating a structure of a subframe for transmission of a DMRS;

BEST MODE

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that may be implemented according to the invention. The following detailed description includes specific details in order to provide a thorough understanding of the present invention. However, it will be apparent to those skilled in the art that the present invention may be practiced without such specific details.

In some instances, well-known structures and devices are omitted in order to avoid obscuring the concepts of the present invention and important functions of the structures and devices are shown in block diagram form. The same reference numbers will be used throughout the drawings to refer to the same or like parts.

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (utra) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as institute of electrical and electronics engineers (IEEE) 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE.

For clarity, the following description focuses on 3GPP LTE/LTE-A. However, technical features of the present invention are not limited thereto.

Figure 1:
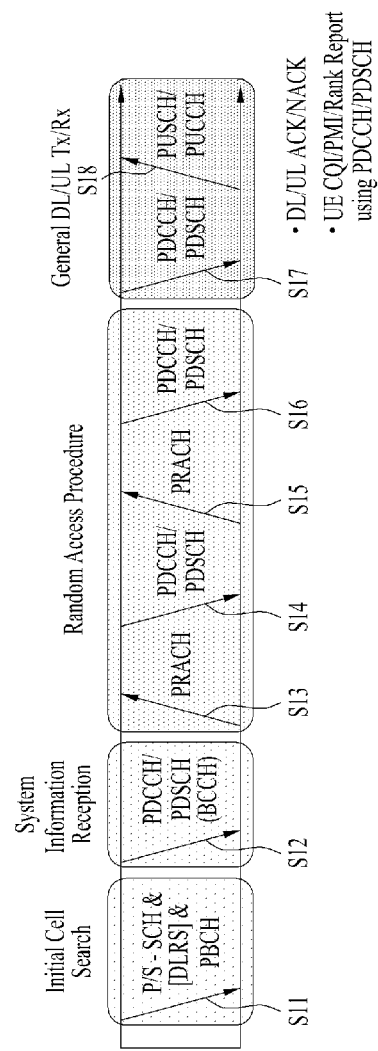
FIG. 1 is a diagram for explanation of physical channels and a general method for transmitting signals on physical channels in a 3rd generation partnership project (3GPP) long term evolution (LTE) system.

1. Overview of 3GPP LTE/LTE-A System to which the Present Invention is Applied 1. 1. Overview of System FIG. 1 is a diagram for explanation of physical channels and a general method for transmitting signals on the physical channels in a 3GPP LTE system.

When a UE is powered on or enters a new cell, the UE performs initial cell search (S11). The initial cell search involves acquisition of synchronization to a base station (BS). To this end, the UE synchronizes its timing to the BS and acquires a cell identifier (ID) and other information by receiving a primary synchronization channel (P-SCH) and a secondary synchronization channel (S-SCH) from the BS.

Then the UE may acquire information broadcast in the cell by receiving a physical broadcast channel (PBCH) from the BS. During the initial cell search, the UE may monitor a downlink channel state by receiving a downlink reference signal (DL RS).

After the initial cell search, the UE may acquire detailed system information by receiving a physical downlink control channel (PDCCH) and a physical downlink shared channel (PDSCH) based on information included in the PDCCH in S12.

In order to complete access to the BS, the UE may perform a random access procedure with the BS (S13 to S16). In the random access procedure, the UE may transmit a preamble on a physical random access channel (PRACH) (S13), and may receive a response message to the preamble on a PDCCH and a PDSCH corresponding to the PDCCH (S14). In case of a contention-based RACH, the UE may additionally perform a contention resolution procedure such as transmission (S15) of an additional PRACH signal and reception (S16) of a PDCCH signal and a PDSCH corresponding to the PDCCH signal.

After the above procedure, the UE may receive a PDCCH and/or a PDSCH from the BS (S17) and transmit a physical uplink shared channel (PUSCH) and/or a physical uplink control channel (PUCCH) to the BS (S18), which is a general downlink and uplink signal transmission procedure.

Control information that the UE transmits to the BS is called uplink control information (UCI). The UCI includes hybrid automatic repeat and request acknowledgement/negative-ack (HARQ-ACK/NACK), scheduling request (SR), channel quality indication (CQI), precoding matrix indication (PMI), Rank Indication (RI) information, etc.

In an LTE system, in general, the UCI is periodically transmitted through a PUCCH. However, in order to simultaneously transmit control information and traffic data, the UCI may be transmitted through a PUSCH. In addition, the UCI may be aperiodically transmitted through a PUSCH according to a request/command of a network.

Figure 2:
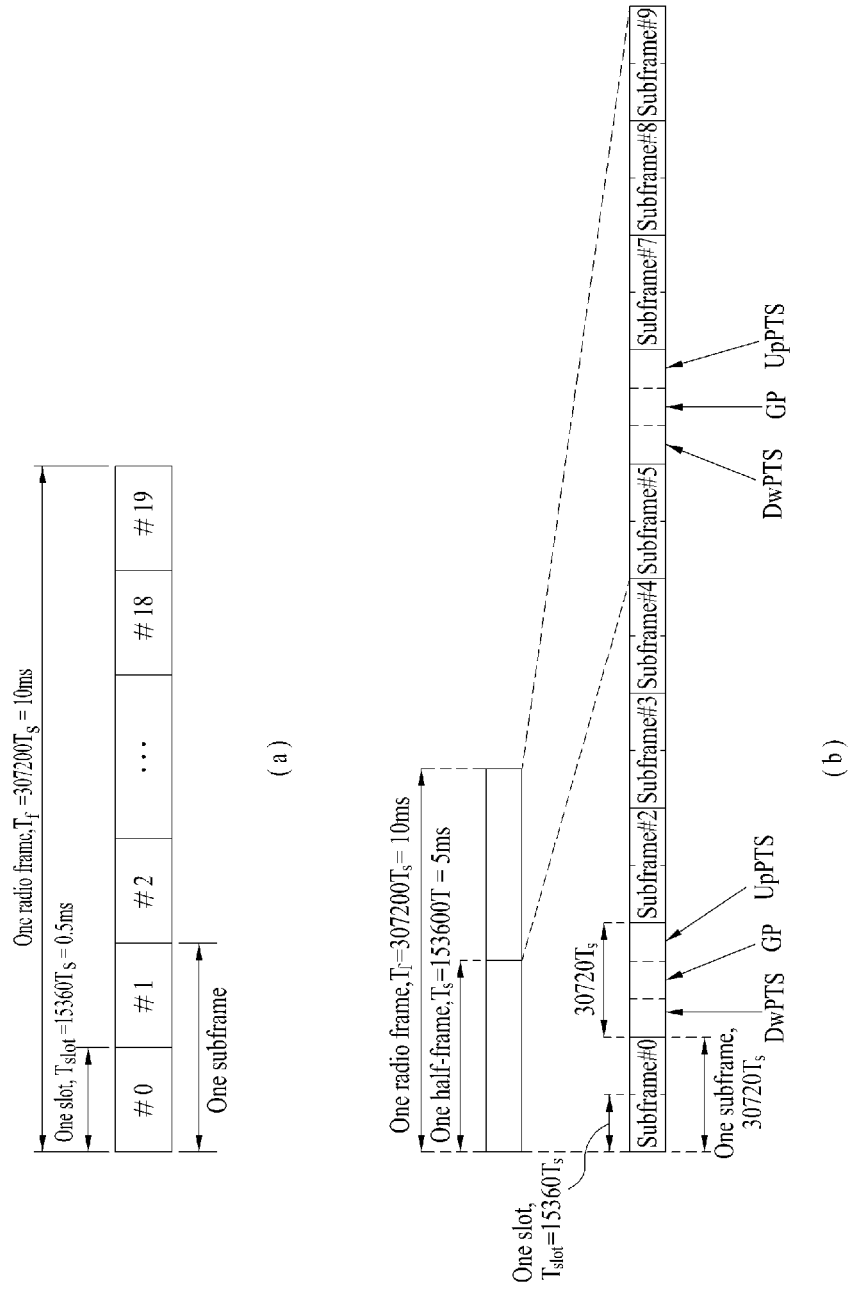
FIG. 2 is a diagram illustrating a structure of a radio frame used in a 3GPP LTE.

FIG. 2 is a diagram illustrating a structure of a radio frame used in a 3GPP LTE.

FIG. 2(a) illustrates a frame structure type 1. The frame structure type 1 may be applied to both a full duplex frequency division duplex (FDD) system and a half duplex FDD system.

One radio frame has a length of $T_f=307200 \cdot T_s=10$ ms and a uniform length of $T_{slot}=15360 \cdot T_s=0.5$ ms. Each radio frame is divided into 20 slots with indexes of 0 to 19. One subframe is defined as two contiguous slots and an ith subframe includes slots corresponding to $2i$ and $2i+1$. That is, a radio frame includes ten subframes. Time for transmission of one subframe is referred to as a transmission time interval (TTI). Here, Ts denotes sampling time and is represented by Ts=1/(15 kHz×2048)=3.2552×10$^{-8}$ (about 33 ns). A slot includes a plurality of OFDM symbols or SC-FDMA symbols in a time domain and includes a plurality of resources block in a frequency domain.

One slot includes a plurality of orthogonal frequency division multiplexing (OFDM) symbols in a time domain. A 3GPP LTE uses the OFDMA in downlink and thus the OFDM symbol is used to represent one symbol period. The OFDM symbol may be referred to as one SC-FDMA symbol or symbol period. A resource block is a resource allocation unit and includes a plurality of contiguous subcarriers in one slot.

In the full duplex FDD system, ten subframes may be simultaneously used for downlink transmission and uplink transmission during each period of 10 ms. In this case, uplink and downlink transmission are separated in a frequency domain. On the other hand, in the half duplex FDD system, a UE cannot simultaneously perform transmission and reception.

The aforementioned structure of the radio frame is purely exemplary and thus the number of subframes included in the radio frame, the number of slots included in a subframe, or the number of OFDM symbols included in a slot may be changed in various ways.

FIG. 2(b) illustrates a frame structure type 2. The frame structure type 2 may be applied to a TDD system. One radio frame has a length of $T_f=307200 \cdot T_s=10$ ms and two half frames having a length of $153600 \cdot T_s=5$ ms. Each half frame includes five subframes having a length of $30720 \cdot T_s=1$ ms. An ith subframe includes two slots with a length of $T_{slot}=15360 \cdot T_s=0.5$ ms corresponding to $2i$ to $2i+1$. Here, Ts denotes sampling time and is represented by Ts=1/(15 kHz× 2048)=3.2552×10$^{-8}$ (about 33 ns).

The frame structure type 2 includes a special subframe including three fields of a downlink pilot time slot (DwPTS), guard period (GP), and uplink pilot time slot (UpPTS). Here, the DwPTS is used for initial cell search, synchronization or channel estimation at user equipment (UE). The UpPTS is used to synchronize channel estimation at the base station with uplink transmission of the UE. The GP is to remove interference occurring in uplink due to multipath delay of downlink signals between uplink and downlink.

Table 1 below shows a special frame configuration (length of DwPTS/GP/UpPTS).

TABLE 1

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 3:
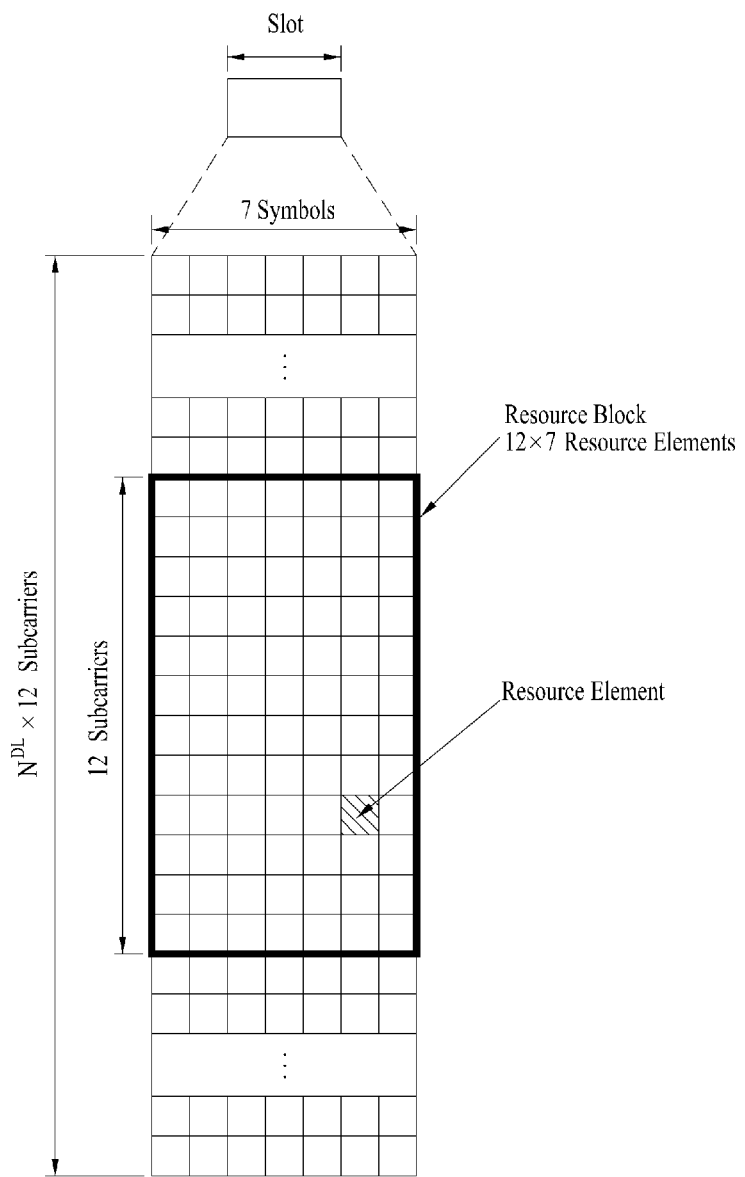
FIG. 3 is a diagram illustrating an example of a resource grid of a downlink slot.

FIG. 3 is a diagram illustrating an example of a resource grid of a downlink slot.

Referring to FIG. 3, one downlink slot includes a plurality of OFDM symbols in a time domain. Here, a downlink slot includes 7 OFDM symbols in a time domain and a resource block (RB) includes 12 subcarriers in a frequency domain, which does not limit the scope and spirit of the present invention.

Each element of the resource grid is referred to as a resource element (RE). An RB includes 12×7 REs. The number of RBs in a downlink slot, $N^{DL}$ depends on a downlink transmission bandwidth. An uplink slot may have the same structure as a downlink slot.

Figure 4:
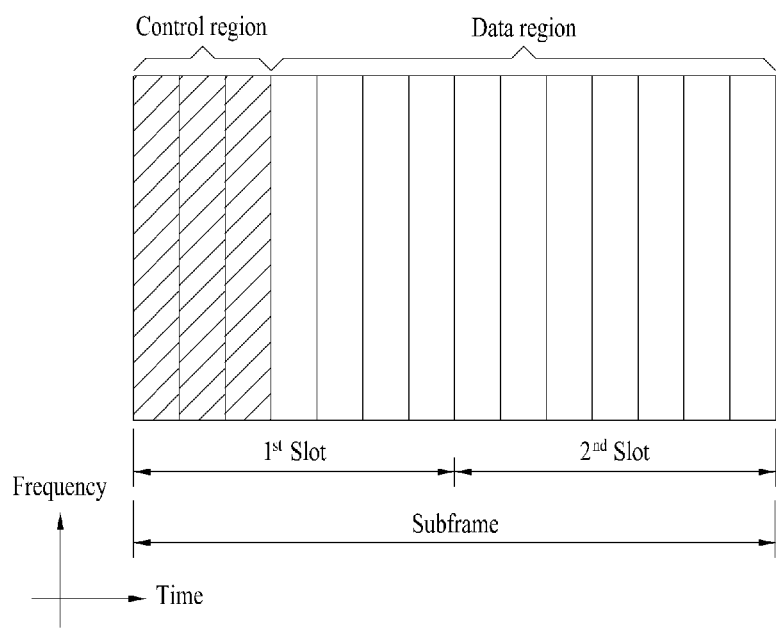
FIG. 4 is a diagram illustrating a structure of a downlink subframe.

FIG. 4 is a diagram illustrating a structure of a downlink subframe.

Referring to FIG. 4, a maximum of 3 OFDM symbols at the start of the first slot in the subframe are used for a control region to which control channels are allocated and the other OFDM symbols of the downlink subframe are used for a data region to which a PDSCH is allocated. Downlink control channels used in the 3GPP LTE system include, for example, a physical control format indicator channel (PCFICH), a physical downlink control channel (PDCCH), and a physical hybrid automatic repeat request (HARQ) indicator channel (PHICH).

The PCFICH is transmitted in the first OFDM symbol of a subframe, carrying information (that is, area of control region) about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink allocation information, or uplink transmission (Tx) power control commands for UE groups.

Figure 5:
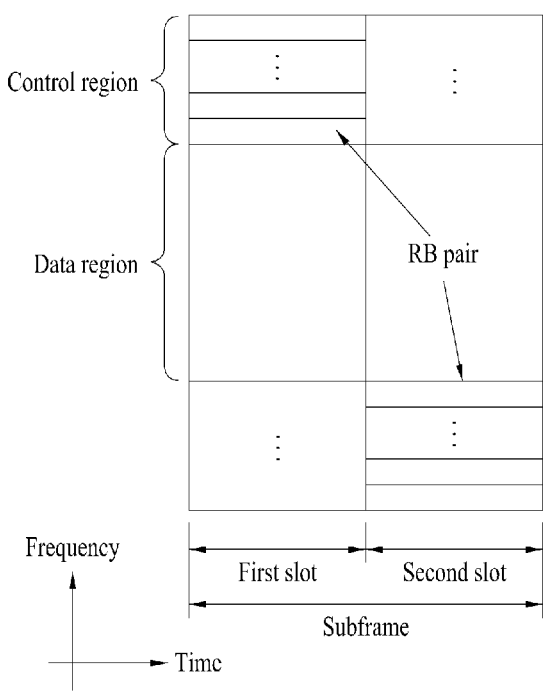
FIG. 5 is a diagram illustrating a structure of an uplink subframe.

FIG. 5 is a diagram illustrating a structure of an uplink subframe.

Referring to FIG. 5, the uplink subframe may be divided into a control region and a data region in the frequency domain. A physical uplink control channel (PUCCH) carrying uplink control information is allocated to the control, region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

1. 2. Physical Downlink Control Channel (PDCCH)

1. 2. 1. Overview of PDCCH

PDCCH may carry resource allocation and transmission format of downlink shared channel (DL-SCH) (which is referred to as downlink grant.), resource allocation information of uplink shared channel (UL-SCH) (which is referred to as uplink grant), paging information on paging channel (PCH), system information on DL-SCH, resource allocation of upper-layer control message such as a random access response transmitted on a PDSCH, a Tx power control command set of individual UEs in a UE group, activation indication information of voice over IP (VoIP), etc. A plurality of PDCCHs may be transmitted in a control region. A UE may monitor a plurality of PDCCHs. A PDCCH includes one control channel element (CCE) or an aggregate of one or several contiguous CCEs. The PDCCH including one CCE or the aggregate of the contiguous CCEs may be subblock-interleaved and transmitted through the control region. The CCE is a logical allocation unit used to provide a coding rate to a PDCCH based on a radio channel state. The CCE corresponds to a plurality of resource element groups (REGs). PDCCH format and a bit number of available PDCCH are determined according to a relationship between the number of the CCEs and the coding rate provided from the CCEs 1. 2. 2. Structure of PDCCH A plurality of multiple PDCCHs for a plurality of UEs may be transmitted in a control region. The PDCCH includes aggregation of one or two contiguous CCES. A CCE refers to a unit corresponding to 9 sets of REGs including four resource elements. Four quadrature phase shift keying (QPSK) symbols are mapped to each REG. Resource elements occupied by reference signals (RSs) are not included in the REG. That is, a total number of REGs in an OFDM symbol may be changed according to whether a cell-specific reference signal is present. A concept of the REG for mapping four resource elements to one group can also be applied to different downlink control channels (e.g., PCFICH or PHICH). When REG that is not allocated to PCFICH or PHICH is $N_{REG}$, the number of available CCEs in the system is $N_{CCE} = \lfloor N_{REG}/9 \rfloor$ and each CCE has an index from 0 to $N_{CCE}-1$.

In order to simplify a decoding procedure of a UE, a PDCCH format including n CCEs may be started from CCEs having the same index as multiple of n. That is, when a CCE index is i, the PDCCH format may be started from a CCE that satisfies i mod n=0.

A BS may use 1, 2, 4, or 8 CCEs in order to configure one PDCCH signal. In this case, {1, 2, 4, 8} is referred to as a CCE aggregation level. The number of CCEs used for transmission of a specific PDCCH is determined by the BS according to a channel state. For example, only one CCE may be sufficient for a PDCCH for a UE having a satisfactory downlink channel state (when the UE is close to the BS). On the other hand, a UE having a poor channel state (when the UE is located at a cell boundary) requires 8 CCEs for sufficient robustness. In addition, a power level of the PDCCH may match a channel state and adjusted.

Table 2 below shows a PDCCH format. Four PDCCH formats are supported according to a CCE aggregation level as shown in Table 1 above.

TABLE 2

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

CCE aggregation levels are different for respective UEs because modulation and coding scheme (MCS) levels or formats of control information contained in a PDCCH are different. An MCS level refers to a code rate and modulation order used in data coding. An adaptive MCS level is used for link adaptation. In general, a control channel for transmission of control information may consider 3 to 4 MCS levels.

A format of control information is now described. Control information transmitted on the PDCCH is referred to as downlink control information (DCI). According to a DCI format, configuration of information contained in PDCCH payload may be changed. The PDCCH payload refers to an information bit. Table 3 below shows a DCI according to a DCI format.

TABLE 3

| DCI Format | Description |
|---|---|
| Format 0 | Resource grants for the PUSCH transmissions (uplink) |
| Format 1 | Resource assignments for single codeword PDSCH transmissions (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |

TABLE 3-continued

| DCI Format | Description |
| --- | --- |
| Format 1C | Very compact resource assignments for PDSCH (e.g. paging/broadcast system information) |
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustment |

As shown in Table 2 above, a DCI format includes Format 0 for PUSCH scheduling, Format 1 for scheduling of one PDSCH codeword, Format 1A for compact scheduling of one PDSCH codeword, Format 1C for very compact scheduling of DL-SCH, Format 2 for PDSCH scheduling in a closed-loop spatial multiplexing mode, Format 2A for PDSCH scheduling in an open-loop spatial multiplexing mode, and Formats 3 and 3A for transmission of a transmission power control (TPC) command for an uplink channel. The DCI Format 1A may be used for PDSCH scheduling regardless of a transmission mode configured for a UE.

A length of the PDCCH payload may be changed according to a DCI format. In addition, a type of the PDCCH payload and a length of the PDCCH payload according thereto may be changed according to whether compact scheduling is used or not or a transmission mode configured for the UE.

The transmission mode may be configured in such a way that the UE receives downlink data on a PDSCH. For example, the downlink data on the PDSCH may include data scheduled for the UE, paging, random access response, or broadcast information on a BCCH. The downlink data on the PDSCH is associated with a DCI format signaled on the PDCCH. The transmission mode may be semi-statically configured in the UE via upper layer signaling (e.g., RRC signaling). The transmission mode may be classified into a single antenna transmission mode or a multi-antenna transmission mode. The UE may semi-statically establish the transmission mode via upper layer signaling. For example, multiple-antenna transmission is performed using transmit diversity, open-loop or closed-loop spatial multiplexing, multi-user-multiple input multiple output (MU-MIMO), beamforming, or the like. The transmit diversity is technology for transmitting the same data in a multiple Tx antennas to increase transmission reliability. The spatial multiplexing is technology for simultaneously transmitting different data in a multiple Tx antenna to transmit data at high speed without increase in bandwidth of a system. The beamforming is technology for applying a weight according to a channel state in a multiple antenna to increase signal to interference plus noise ratio (SINR) of a signal.

The DCI format depends on a transmission mode configured for the UE. The UE may use a reference DCI format monitored thereby according to a transmission mode configured for the UE. The transmission mode configured for the UE may include the following seven transmission modes.

(1) single antenna port; port 0
(2) transmit diversity
(3) open-loop spatial multiplexing
(4) closed-loop spatial multiplexing
(5) multiple user MIMO
(6) closed loop=1 precoding
(7) single antenna port; port 5

1. 2. 3. PDCCH Transmission

A BS determines a PDCCH format according to DCI to be transmitted to a UE and adds cyclic redundancy check (CRC) to control information. The CRC is masked by a dedicated identifier (ID) (which is known as a radio network temporary identifier (RNTI)) according to the owner or usage of the PDCCH. If the PDCCH is destined for a specific UE, the CRC may be masked by a dedicated ID, for example, a cell-RNTI (C-RNTI) of the UE. If the PDCCH carries a paging message, the CRC of the PDCCH may be masked by a paging indicator identifier (P-RNTI). If the PDCCH carries system information, particularly, a system information block (SIB), its CRC may be masked by a system information ID and a system information RNTI (SI-RNTI). To indicate that the PDCCH carries a random access response to a random access preamble transmitted by a UE, its CRC may be masked by a random access-RNTI (RA-RNTI).

Then the BS channel-codes the control information to which the CRC is added to generate coded data. In this case, the channel coding may be performed with a code rate according to an MCS level. The BS performs transmission rate matching according to a CCE aggregation level allocated to a PDCCH format and modulates the coded data to generate modulation symbols. In this case, a modulation sequence according to an MCS level may be used. A CCE aggregation level of modulation symbols included in one PDCCH may be any one of 1, 2, 4, and 8. Then the BS performs CCE to RE mapping on the modulation symbols.

1. 2. 4. Blind Decoding

A plurality of PDCCHs may be transmitted in one subframe. That is, a control region of one subframe includes a plurality of CCEs with an index 0 to $N_{CCE,k}-1$. Here, $N_{CCE,k}$ refers to a total number of CCEs in a control region of a kth subframe. A UE monitors a plurality of PDCCHs every subframe. Here, monitoring refers to trial of decoding of PDCCHs according to a PDCCH format monitored by the UE. The BS does not provide information regarding a position of corresponding PDCCH to the UE via a control region allocated in a subframe. In order to receive a control channel transmitted from the BS, the UE cannot know a position where PDCCH of the UE is transmitted and a CCE aggregation level or a DCI format at which the PDCCH is transmitted, and thus the UE monitors a set of PDCCH candidates in a subframe to search for a PDCCH for the UE, which is called blind decoding/detection (BD). The BD refers to a method in which a UE de-masks a UE ID of the UE to a CRC portion and then checks CRC errors to check whether corresponding PDCCH is a control channel of the UE.

In an active mode, the UE monitors a PDCCH every subframe in order to receive data transmitted to the UE. In a DRX mode, the UE wakes up in a monitoring duration every DRX period and monitors PDCCH in a subframe corresponding the monitoring duration. A subframe in which monitoring of PDCCH is performed is referred to as a non-DRX subframe.

The UE needs to perform binding decoding on all CCEs present in a control region of the non-DRX subframe in order to receive PDCCH transmitted to the UE. The UE cannot know a format of the transmitted PDCCH. Thus, all PDCCHs need to be decoded at an available CCE aggregation level until blind decoding of the PDCCH is successfully performed every non-DRX subframe. The UE cannot know the number of CCEs used by PDCCH for the UE and thus the UE needs to try detection at all available CCE aggregation levels until blind decoding of PDCCH is successfully performed.

An LTE system defines the concept of a search space (SS) for blind decoding of the UE. The SS may refer to a PDCCH candidate set to be monitored and have different sizes according to a PDCCH format. The SS may include a common search space (CSS) and UE-specific/dedicated search space (USS). With regard to the CSS, all UEs can know the size of the CSS. However, the USS can be separately configured for each respective UE. Thus, the UE needs to monitor both the CSS and the USS in order to decode PDCCH and thus needs to perform BD a maximum of 44 times in one subframe. Here, BD performed according to different CRC values (e.g., C-RNTI, P-RNTI, SI-RNTI, and RA-RNTI) is not used.

Due a small SS, the BS cannot frequently ensure CCE resources for transmitting a PDCCH to all UEs that desire to transmit a PDCCH in a predetermined subframe. This is because remaining resources after a CCE position is allocated may not be included in the SS of a specific UE. In order to minimize this problem that may continuously arises in a next subframe, a UE-specific hopping sequence may be applied to a start point of the USS.

Table 4 below shows sizes of the CSS and the USS.

TABLE 4

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

In order to reduce calculation load of the UE according to the number of trails of blind decoding, the UE does not simultaneously perform searches according to all defined DCI formats. In detail, the UE always performs searches on the DCI format 0 and 1A in the USS. In this case, the DCI formats 0 and 1A have the same size. However, the UE can differentiate DCI formats using flag for format 0/format 1A differentiation used to differentiate the DCI formats 0 and 1A included in PDCCH. In addition, the UE may require other DCI formats other than the formats 0 and 1A, for example, the DCI formats 1, 1B, and 2.

In the CSS, the UE may search for the DCI formats 1A and 1C. In addition, the UE may be configured to search for the DCI format 3 or 3A and the DCI formats 3 and 3A have the same size as the DCI formats 0 and 1A. However, the UE may identify a DCI format using a scrambled CRC using other identifiers other than a UE-specific ID.

A search space $S_k^{(L)}$ refers to a PDCCH candidate set according to an aggregation level $L \in \{1,2,4,8\}$. A CCE according to a PDCCH candidate set m of an SS may be determined according to Expression 1 below.

$$L \cdot \{(Y_k+m) \bmod \lfloor N_{CCE,k}/L \rfloor\} + i \quad \text{[Expression 1]}$$

Here, $M^{(L)}$ is the number of PDCCH candidates according to a CCE aggregation level L for monitoring in an SS and satisfies m=0, ..., $M^{(L)}-1$. i is an index for determination of a separate CCE in each respective PDCCH candidate in the PDCCH and satisfies i=0, ..., L−1. $k=\lfloor n_s/2 \rfloor$ is satisfied and $n_s$ is a slot index in a radio frame.

As described above, the UE monitors both a USS and a CSS in order to decode the PDCCH. Here, the CSS supports PDCCHs having an aggregation level of {4, 8} and the USS supports PDCCHs having an aggregation level of {1, 2, 4, 8}. Table 5 below shows PDCCH candidates monitored by the UE.

TABLE 5

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to Expression 1 above, in case of the CSS, $Y_k$ is configured to 0 with regard to two aggregation levels, L=4 and L=8. On the other hand, in case of the USS, $Y_k$ is defined according to Expression 2 below with regard to an aggregation level L.

$$Y_k = (A \cdot Y_{k-1}) \bmod D \quad \text{[Expression 2]}$$

Here, $Y_{-1} = n_{RNTI} \neq 0$ is satisfied and $n_{RNTI}$ is RNTI. In addition, A=39827 and D=65537 are satisfied.

2. Reference Signal (RS)

2. 1. Downlink RS

In a wireless communication system, data/signals are transmitted on a radio channel and thus the data/signals may be distorted on the radio channel during transmission. To accurately receive the signal successfully, a receiver should compensate for the distortion of the received signal using channel information. To enable the receiver to detect the channel information, a transmitter and/or a receiver may use an RS known to both the transmitter and the receiver. The RS is called as a pilot signal.

In case of data transmission and reception through multiple input/output antennas, knowledge of channel states between Tx antennas and Rx antennas is required for successful signal reception. Accordingly, an RS should exist for each Tx antenna of the transmitter in order to detect a channel state of the receiver.

Downlink RSs are categorized into common RS (CRS) shared among all UEs and dedicated RS (DRS) specific to a specific UE. The transmitter may deliver information for channel measurement and demodulation using these RSs CRS and DRS.

A receiver (i.e. a UE) may feed back a channel quality-related indicator such as a channel quality indicator (CQI), a precoding matrix index (PMI), and/or a rank indicator (RI) to a transmitter (i.e. a BS) by estimating channel states using CRSs. The CRS is also called a cell-specific RS. An RS related to feedback of channel state information (CSI) such as a CQI/PMI/RI may be separately defined as a CSI-RS.

A DRS may be transmitted on a predetermined RE when data transmitted on a PDSCH needs to be demodulated. The UE may be notified whether a DRS exists. The DRS is valid only when a related PDSCH is mapped. The DRS is also called a UE-specific RS or demodulation reference signal (DMRS).

FIG. 6 is a diagram illustrating patterns in which RSs are mapped to a DL RB pair, as defined in a 3GPP LTE.

An RS mapping unit, i.e. a DL RB pair may include one subframe in time domain by 12 subcarriers in a time domain. That is, one RB pair has a length of 14 OFDM symbols on a time axis in the case of a normal CP (see FIG. 6(a)) and 12 OFDM symbols on a time axis in the case of an extended CP (see FIG. 6(b)).

In FIG. 6, REs labeled with '0', '1', '2' and '3' in each RB are REs to which CRSs corresponding to antenna ports '0', '1', '2', and '3' of a transmitter (e.g., a BS) and REs labeled with 'D' denote REs to which a DRS is mapped.

The CRS will be described below in detail.

CRSs may be common to all UEs within a cell, distributed across a total frequency band, and used for estimating channels of physical antenna ends. The CRSs may serve the purpose of CSI acquisition and data demodulation.

CRSs are configured in various formats depending on the antenna configuration of a transmitter (e.g., a BS). A transmitter of the 3GPP LTE system (e.g. conforming to Release-8) can supports Tx antennas up to 4 Tx antennas.

When multiple input/output antennas are supported and one or more antenna ports transmit RSs, the RSs are transmitted on predetermined REs according to a predetermined RS pattern, while transmitting no signal on REs designated for the other antenna ports. That is, RSs of different antennas do not overlap each other.

2. 2. Uplink RS

Figure 7:
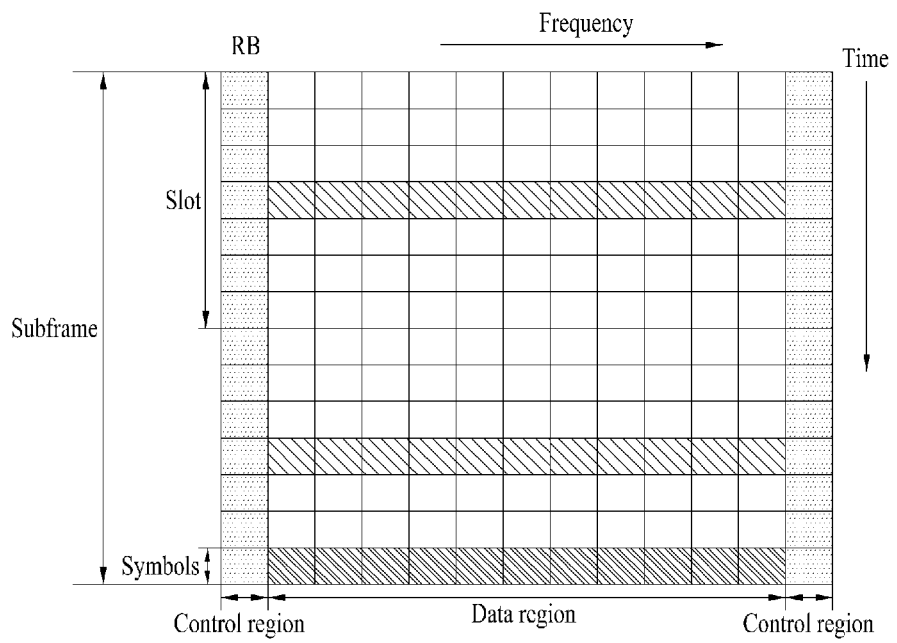
FIG. 7 is another diagram illustrating a structure of an uplink subframe.

FIG. 7 is another diagram illustrating a structure of an uplink subframe.

Referring to FIG. 7, a sounding reference signal (SRS) may be periodically or aperiodically transmitted from a UE in order to estimate a channel of a subband other than a band for transmission of a PUSCH or to acquire information of a channel corresponding an entire uplink bandwidth (i.e., a wide band). When the SRS is periodically transmitted, a corresponding period may be determined via upper layer signaling. When the SRS is aperiodically transmitted, the UE may indicate the SRS using a field 'SRS request' in a PDCCH uplink/downlink DCI format or transmit a triggering message. As in an example shown in FIG. 7, a region in one subframe for transmission of the SRS is a section of the last SC-FDMA on a time axis. SRSs of various UEs, transmitted on the last SC-FDMA in the same subframe, can be differentiated according to a frequency position. The SRS is transmitted without discrete fourier transform (DFT) calculation for conversion into SC-FDMA and a precoding matrix used in PUSCH, unlike in the PUSCH.

Furthermore, a region for transmission of a demodulation-reference signal (DMRS) in one subframe is a section of intermediate SC-FDMA symbol of each slot on a time axis. Similarly, the DMRS is transmitted via a data transmission bandwidth on a frequency axis. For example, a DMRS is transmitted on a fourth SC-FDMA symbol and an $11^{th}$ SC-FDMA symbol in a subframe to which general CP is applied.

The DMRS may be combined with PUSCH or PUCCH transmission. The SRS is an RS transmitted to the BS from the UE for uplink scheduling. The BS estimates an uplink link channel through the received SRS and uses the estimated uplink channel in the uplink channel. The SRS is not combined with the PUSCH or PUCCH transmission. For the DMRS and the SRS, the same type of basic sequences may be used. Precoding applied to a DMRS during uplink multiple antenna transmission may be the same as precoding applied to PUSCH.

Figure 8:
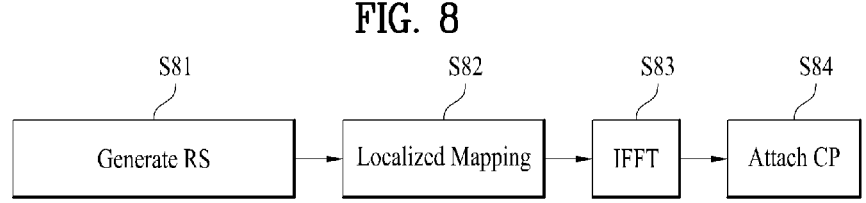
FIG. 8 is a diagram for explanation of a procedure of processing a signal for transmission of an RS in uplink.

FIG. 8 is a diagram for explanation of a procedure of processing a signal for transmission of an RS in uplink.

As illustrated in FIG. 8, data generates a signal in a time domain, is frequency-mapped through a DFT precoder, and is transmitted through an IFFT. On the other hand, with regard to an RS, a procedure of transmitting the RS through the DFT precoder is omitted. In detail, a reference sequence is directly generated in a frequency domain (S81), locally mapped (S82), and transmitted through an IFFT (S83), a cyclic prefix (CP) is attached to the reference sequence (S84), and then the reference sequence is transmitted, which are sequentially performed.

FIG. 9 is a diagram illustrating a structure of a subframe for transmission of a DMRS.

FIG. 9(a) illustrates the structure of the subframe for transmission of a DMRS in case of a normal CP and FIG. 9(b) illustrates the structure of the subframe for transmission of a DMRS in case of an extended CP. Referring to FIG. 9(a), in case of the normal CP, the DMRS is transmitted through $4^{th}$ and $11^{th}$ SC-FDMA symbols. Referring to FIG. 9(b), in case of the extended CP, the DMRS is transmitted through $3^{rd}$ and $9^{th}$ SC-FDMA symbols.

2. 2. 1. DMRS of PUSCH

An RS of a PUSCH is determined as follows.

An RS sequence $r_{PUSCH}^{(\lambda)}(\cdot)$ of a PUSCH corresponds to a layer index $\lambda \in \{0,1,\ldots,\upsilon-1\}$ and is defined according to Expression 3 below.

$$r_{PUSCH}^{(\lambda)}(m \cdot M_{sc}^{RS} + n) = w^{(\lambda)}(m) r_{u,v}^{(\alpha_\lambda)}(n) \quad \text{[Expression 3]}$$

Here, m and n satisfy $$m = 0, 1$$
$$n = 0, \ldots, M_{sc}^{RS} - 1 \text{ and } M_{sc}^{RS} = M_{sc}^{PUSCH}$$

is satisfied.

An orthogonal sequence $w^{(\lambda)}(m)$ is configured as $[w^{\lambda}(0)\ w^{\lambda}(1)]=[1\ 1]$ for a DCI format 0 when an upper layer parameter 'Activate-DMRS-with OCC' is not configured or a temporal C-RNTI is not used to transmit DCI associated with the latest uplink. On the other hand, the orthogonal sequence $w^{(\lambda)}(m)$ may be configured as shown in Table 6 below according to a cyclic shift field included in the DCI associated with the latest uplink of a transport block associated with corresponding PUSCH transmission.

$[w^{(\lambda)}(0)\ w^{(\lambda)}(1)]$ refers to an orthogonal sequence corresponding to a layer index $\lambda$. In particular, $w^{(\lambda)}(0)$ is a value applied to a first slot of the layer index $\lambda$ and $w^{(\lambda)}(1)$ is a value applied to a second slot of the layer index $\lambda$.

Table 6 below shows a relationship between $n_{DMRS,\lambda}^{(2)}$ and $[w^{(\lambda)}(0)\ w^{(\lambda)}(1)]$, and a cyclic shift field included in the DCI associated with uplink.

TABLE 6

| Cyclic Shift Field in uplink-related DCI | $n_{DMRS,\lambda}^{(2)}$ | | | | $[W^{(\lambda)}(0)\ W^{(\lambda)}(1)]$ | | | |
|---|---|---|---|---|---|---|---|---|
| format [3] | $\lambda = 0$ | $\lambda = 1$ | $\lambda = 2$ | $\lambda = 3$ | $\lambda = 0$ | $\lambda = 1$ | $\lambda = 2$ | $\lambda = 3$ |
| 000 | 0 | 6 | 3 | 9 | [1 1] | [1 1] | [1 −1] | [1 −1] |
| 001 | 6 | 0 | 9 | 3 | [1 −1] | [1 −1] | [1 1] | [1 1] |
| 010 | 3 | 9 | 6 | 0 | [1 −1] | [1 −1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 −1] | [1 −1] | [1 −1] | [1 −1] |
| 110 | 10 | 4 | 1 | 7 | [1 −1] | [1 −1] | [1 −1] | [1 −1] |
| 111 | 9 | 3 | 0 | 6 | [1 1] | [1 1] | [1 −1] | [1 −1] |

A cyclic shift value $\alpha_\lambda$ in a slot $n_s$ may be defined according to Expression 4 below and $n_{cs,\lambda}$ may be defined according to Expression 5 below.

$$\alpha_\lambda = 2\pi n_{cs,\lambda}/12 \quad \text{[Expression 4]}$$

$$n_{cs,\lambda} = (n_{DMRS}^{(1)} + n_{DMRS,\lambda}^{(2)} + n_{PN}(n_s)) \bmod 12 \quad \text{[Expression 5]}$$

$n_{DMRS}^{(1)}$ is indicated by an upper layer parameter 'cyclic-Shift'. Table 7 shows a relationship between a parameter and $n_{DMRS}^{(1)}$.

TABLE 7

| cyclicShift | $n_{DMRS}^{(1)}$ |
|---|---|
| 0 | 0 |
| 1 | 2 |
| 2 | 3 |
| 3 | 4 |
| 4 | 6 |
| 5 | 8 |
| 6 | 9 |
| 7 | 10 |

$n_{DMRS,\lambda}^{(2)}$ is determined according to a cyclic shift value for a DMRS field in a DCI associated with the latest uplink of a transport block corresponding to PUSCH transmission and is shown in Table 6 above.

Referring to Table 6, when PDCCHs including the DCI associated with uplink in the same transport block are not transmitted, if an initial PUSCH is semi-persistently scheduled in the same transport block, or the initial PUSCH is scheduled by random access response grant in the same transport block, $n_{DMRS,\lambda}^{(2)}$ may have a value shown in a first row of Table 6 above.

When the DCI associated with uplink is not present in the same transport block, if the initial PUSCH for the same transport block is semi-statically scheduled or scheduled by random access response, $n_{DMRS,\lambda}^{(2)}$ may be used to acquire $n_{DMRS,0}^{(2)}$ and $w^{(\lambda)}(m)$.

$n_{PN}(n_s)$ may be defined according to Expression 6 below.

$$n_{PN}(n_s) = \sum_{i=0}^{7} c(8N_{symb}^{UL} \cdot n_s + i) \cdot 2^i \qquad \text{[Expression 6]}$$

c(i) is a pseudo-random sequence and a cell-specific value. A pseudo-random sequence generator may initiate the pseudo-random sequence as $$c_{init} = \left\lfloor \frac{N_{ID}^{cell}}{30} \right\rfloor \cdot 2^5 + f_{ss}^{PUSCH}$$

at a start of a radio frame.

A vector of an RS may be precoded according to Expression 7 below.

$$\begin{bmatrix} \tilde{r}_{PUSCH}^{(0)} \\ \vdots \\ \tilde{r}_{PUSCH}^{(P-1)} \end{bmatrix} = W \begin{bmatrix} r_{PUSCH}^{(0)} \\ \vdots \\ r_{PUSCH}^{(\upsilon-1)} \end{bmatrix} \qquad \text{[Expression 7]}$$

Here, P is the number of antenna ports used for PUSCH transmission. When the PUSCH is transmitted using one antenna port, P=1, W=1, and $\upsilon$=1. In case of spatial multiplexing, P=2 or P=4. With regard to a precoding matrix W, the same precoding matrix for precoding of the PUSCH may be used in the same subframe.

A physical mapping method for an uplink RS in the PUSCH will now be described.

With respect to each antenna port used for PUSCH transmission, a sequence $\tilde{r}_{PUSCH}^{(\tilde{p})}(\cdot)$ is multiplied by an amplitude scaling factor $\beta_{PUSCH}$ and mapped to a sequence from $\tilde{r}_{PUSCH}^{(\tilde{p})}(0)$. A relationship between a physical resource block set and an index $\tilde{p}$ used in a mapping procedure and an antenna port number p is the same as in corresponding PUSCH transmission. The sequence $\tilde{r}_{PUSCH}^{(\tilde{p})}(\cdot)$ is mapped to an RE with an index (k,l) at l=3 in case of normal CP and at l=2 in case of extended CP in an order of increasing k and then increasing a slot number.

2. 2. 2. DMRS of PUCCH

An RS of a PUCCCH is determined as follows.

An RS sequence $r_{PUCCH}^{(\tilde{p})}(\cdot)$ of a PUCCH is defined according to Expression 8 below.

$$r_{PUCCH}^{(\tilde{p})}(m' N_{RS}^{PUCCH} M_{sc}^{RS} + m M_{sc}^{RS} + n) = \qquad \text{[Expression 8]}$$
$$\frac{1}{\sqrt{P}} \bar{w}^{(\tilde{p})}(m) z(m) r_{u,v}^{(\alpha_{\tilde{p}})}(n)$$

Here, m satisfies $$m = 0, \ldots, N_{RS}^{PUCCH} - 1$$
$$n = 0, \ldots, M_{sc}^{RS} - 1$$
$$m' = 0, 1$$

and P is the number of antenna ports used for PUCCH transmission. In case of PUCCH formats 2a and 2, z(m) is d(10) in case of m=1. In other cases, z(m)=1 is satisfied.

When $M_{sc}^{RS}$=12, a sequence $r_{u,v}^{(\alpha_{\tilde{p}})}(n)$ represented by $\alpha_{\tilde{p}}$ is determined in a PUCCH format.

In case of PUCCH formats 1, 1a, and 1b, $\alpha_{\tilde{p}}(n_s, l)$ is defined according to Expression 9 below.

$$\bar{n}_{oc}^{(\tilde{p})}(n_s) = \lfloor n_p'(n_s) \cdot \Delta_{shift}^{PUCCH} / N' \rfloor \qquad \text{[Expression 9]}$$

$$\alpha_{\tilde{p}}(n_s, l) = 2\pi \cdot \bar{n}_{cs}^{(\tilde{p})}(n_s, l) / N_{sc}^{RB}$$

$$\bar{n}_{cs}^{(\tilde{p})}(n_s, l) = \begin{cases} \left[ n_{cs}^{cell}(n_s, l) + \left( \begin{array}{c} n_p'(n_s) \cdot \Delta_{shift}^{PUCCH} + \\ (\bar{n}_{oc}^{(\tilde{p})}(n_s) \bmod \Delta_{shift}^{PUCCH}) \end{array} \right) \bmod N' \right] \bmod N_{sc}^{RB} & \text{for normal cyclic prefix} \\ \left[ n_{cs}^{cell}(n_s, l) + (n_p'(n_s) \cdot \Delta_{shift}^{PUCCH} + \bar{n}_{oc}^{(\tilde{p})}(n_s)) \bmod N' \right] \bmod N_{sc}^{RB} & \text{for extended cyclic prefix} \end{cases}$$

Here, $n_p'(n_s)$, N', $\Delta_{shift}^{PUCCH}$, and $n_{cs}^{cell}(n_s, l)$ are predefined. The number $N_{RS}^{PUCCH}$ of RS symbols per slot is shown in Table 8 below.

Table 8 below shows the number of PUCCH demodulation-reference symbols per slot.

TABLE 8

| PUCCH format | Normal cyclic prefix | Extended cyclic prefix |
|---|---|---|
| 1, 1a, 1b | 3 | 2 |
| 2, 3 | 2 | 1 |
| 2a, 2b | 2 | N/A |

Table 9 shows an orthogonal sequence $[\overline{w}^{(\tilde{p})}(0) \ldots \overline{w}^{(\tilde{p})}(N_{RS}^{PUCCH}-1)]$ in PUCCH formats 1, 1a, and 1b.

TABLE 9

| Sequence index $\overline{n}_{oc}^{(\tilde{p})}$ ($n_s$) | Normal cyclic prefix | Extended cyclic prefix |
|---|---|---|
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

Table 10 below shows an orthogonal sequence $[\overline{w}^{(\tilde{p})}(0) \ldots \overline{w}^{(\tilde{p})}(N_{RS}^{PUCCH}-1)]$ in PUCCH formats 2, 2a, 2b, and 3.

TABLE 10

| Normal cyclic prefix | Extended cyclic prefix |
|---|---|
| [1 1] | [1] |

In case of a PUCCH format 3, $\alpha_{\tilde{p}}(n_s,l)$ is defined according to Expression 10 below.

$$\alpha_{\tilde{p}}(n_s,l) = 2\pi \cdot n_{cs}^{(\tilde{p})}(n_s,l)/N_{sc}^{RB}$$

$$n_{cs}^{(\tilde{p})}(n_s,l) = (n_{cs}^{cell}(n_s,l) + n'_{\tilde{p}}(n_s)) \bmod N_{sc}^{RB} \quad \text{[Expression 10]}$$

Here, $n'_{\tilde{p}}(n_s)$ is defined as shown in Table 11 below. $n_{oc,0}^{(\tilde{p})}$ and $n_{oc,1}^{(\tilde{p})}$ correspond to a first slot and a second slot in one subframe, respectively.

Table 11 below shows a relationship between $n_{oc}^{(\tilde{p})}$ and $n'_{\tilde{p}}(n_s)$ in a PUCCH format 3.

TABLE 11

| | $n'_{\tilde{p}}(n_s)$ | |
|---|---|---|
| $n_{oc}^{(\tilde{p})}$ | $N_{SF,1} = 5$ | $N_{SF,1} = 4$ |
| 0 | 0 | 0 |
| 1 | 3 | 3 |
| 2 | 6 | 6 |
| 3 | 8 | 9 |
| 4 | 10 | N/A |

A physical mapping method for an uplink RS in a PUCCH will now be described.

With respect to each antenna port used for PUCCH transmission, a sequence $r_{PUCCH}^{(\tilde{p})}(\cdot)$ is multiplied by an amplitude scaling factor $\beta_{PUSCH}$ and mapped to a sequence from $r_{PUCCH}^{(\tilde{p})}(0)$. The sequence $r_{PUCCH}^{(\tilde{p})}(\cdot)$ is mapped to an RE with an index (k,l) in an order of increasing k, increasing l and then increasing a slot number. A relationship between k and index $\tilde{p}$, and an antenna port number p is the same as in corresponding PUCCH transmission. A symbol index l in a slot is shown in Table 12 below.

Table 12 below shows a position of a DMRS for each respective PUCCH format.

TABLE 12

| | Set of values for l | |
|---|---|---|
| PUCCH format | Normal cyclic prefix | Extended cyclic prefix |
| 1, 1a, 1b | 2, 3, 4 | 2, 3 |
| 2, 3 | 1, 5 | 3 |
| 2a, 2b | 1, 5 | N/A |

2. 2. 3. Sounding Reference Signal (SRS)

An SRS is determined as follows.

The SRS includes constant amplitude zero auto correlation (CAZAC) sequences. SRSs transmitted from various UEs correspond to CAZAC sequences $r^{SRS}(n) = r_{u,v}^{(\alpha)}(n)$ having different cyclic shift values α according to Expression 11 below. Here, u is a PUCCH sequence group number and v is a basic sequence number.

$$\alpha_{\tilde{p}} = 2\pi \frac{n_{SRS}^{cs,\tilde{p}}}{8} \quad \text{[Expression 11]}$$

$$n_{SRS}^{cs,\tilde{p}} = \left(n_{SRS}^{cs} + \frac{8\tilde{p}}{N_{ap}}\right) \bmod 8$$

$$\tilde{p} \in \{0, 1, \ldots, N_{ap} - 1\}$$

Here, $n_{SRS}^{cs}$ is configured for each respective UE via an upper layer, configured for each configuration of periodical and aperiodic sounding using upper layer parameters 'cyclicShift' and 'cyclicShift-ap', and has an integer of 0 to 7. $N_{ap}$ is the number of antenna ports used for SRS transmission.

A physical mapping method for SRS will now be described.

In order to satisfy transmission power $P_{SRS}$, an SRS sequence is multiplied by an amplitude scaling factor $\beta_{PUSCH}$ and mapped to an RE with an index (k,l) with respect to an antenna port p from $r_{SRS}^{(\tilde{p})}(0)$ according to Expression 12 below.

$$a_{2k'+k_0^{(p)},l}^{(p)} = \quad \text{[Expression 12]}$$

$$\begin{cases} \frac{1}{\sqrt{N_{ap}}} \beta_{SRS} r_{SRS}^{(\tilde{p})}(k') & k' = 0, 1, \ldots, M_{sc,b}^{RS} - 1 \\ 0 & \text{otherwise} \end{cases}$$

$N_{ap}$ is the number of antenna ports used for SRS transmission. A set of antenna ports used for SRS transmission is independently determined for configuration and period of aperiodic sounding. Here, $k_0^{(p)}$ is a start of a frequency domain of an SRS and $M_{sc,b}^{RS}$ is a length of a SRS sequence, that is, a bandwidth represented in a subcarrier unit defined according to Expression 13 below.

$$M_{sc,b}^{RS} = m_{SRS,b} N_{sc}^{RB}/2 \quad \text{[Expression 13]}$$

Here, $m_{SRS,b}$ is a value that is signaled from a BS according to an uplink bandwidth $N_{RB}^{UL}$ as shown in Tables 13 to 16 below.

In order to acquire $m_{SRS,b}$, a cell-specific parameter $C_{SRS}$, an integer of 0 to 7 and a UE-specific parameter $B_{SRS}$, an integer of 0 to 3 are required. $C_{SRS}$ is given using an upper layer cell-specific parameter 'srs-BandwidthConfig' and $B_{SRS}$ is given using an upper layer UE-specific parameter 'srs-Bandwidth'.

Table 13 below shows $m_{SRS,b}$ and $N_b$ according to b=0, 1, 2, 3 when an uplink bandwidth satisfies $6 \leq N_{RB}^{UL} \leq 40$.

TABLE 13

| SRS bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 36 | 1 | 12 | 3 | 4 | 3 | 4 | 1 |
| 1 | 32 | 1 | 16 | 2 | 8 | 2 | 4 | 2 |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

Table 14 below shows $m_{SRS,b}$ and $N_b$ according to b=0, 1,2,3 when an uplink bandwidth satisfies $40 < N_{RB}^{UL} \leq 60$.

TABLE 14

| SRS bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

Table 15 below shows $m_{SRS,b}$ and $N_b$ according to b=0, 1,2,3 when an uplink bandwidth satisfies $60 < N_{RB}^{UL} \leq 80$.

TABLE 15

| SRS bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | 4 | 5 | 4 | 1 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | 4 | 5 | 4 | 1 |
| 6 | 36 | 1 | 12 | 3 | 4 | 3 | 4 | 1 |
| 7 | 32 | 1 | 16 | 2 | 8 | 2 | 4 | 2 |

Table 16 shows $m_{SRS,b}$ and $N_b$ according to b=0,1,2,3 when an uplink bandwidth satisfies $80 < N_{RB}^{UL} \leq 110$.

TABLE 16

| SRS bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

In case of an UpPTS field, reconfiguration of $m_{SRS,0}$ may be activated using an upper layer cell parameter 'srsMaxUpPts' according to Expression 14 below.

$$m_{SRS,0}^{max} = \max_{c \in C}\{m_{SRS,0}^c\} \le (N_{RB}^{UL} - 6N_{RA}) \quad \text{[Expression 14]}$$

On the other hand, when the reconfiguration is deactivated, $m_{SRS,0}^{max} = m_{SRS,0}$ is satisfied. Here, c is an SRS frequency bandwidth configuration value and $C_{SRS}$ is an SRS configuration set for each respective uplink bandwidth $N_{RB}^{UL}$ as shown in Tables 13 through 16 above. $N_{RA}$ is the number of format 4 of physical random access channels included in the UpPTS.

A start point $k_0$ in a frequency domain is defined according to Expression 15 below.

$$k_0^{(p)} = \bar{k}_0^{(p)} + \sum_{b=0}^{B_{SRS}} 2M_{sc,b}^{RS} n_b \quad \text{[Expression 15]}$$

Here, a normal uplink subframe $\bar{k}_0^{(p)}$ is defined according to Expression 16 below.

$$\bar{k}_0^{(p)} = (\lfloor N_{RB}^{UL}/2 \rfloor - m_{SRS,0}/2)N_{sc}^{RB} + k_{TC}^{(p)} \quad \text{[Expression 16]}$$

$\bar{k}_0^{(p)}$ with respect to UpPTS is defined according to Expression 17 below.

$$\bar{k}_0^{(p)} = \begin{cases} (N_{RB}^{UL} - m_{SRS,0}^{max})N_{sc}^{RB} + k_{TC}^{(p)} & \text{if } ((n_f \bmod 2)\cdot(2-N_{SP}) + n_{hf}) \bmod 2 = 0 \\ k_{TC}^{(p)} & \text{otherwise} \end{cases} \quad \text{[Expression 17]}$$

$k_{TC}^{(p)} \in \{0,1\}$ is defined according to Expression 18 below.

$$k_{TC}^{(p)} = \begin{cases} 1 - \bar{k}_{TC} & \text{if } n_{SRS}^{cs,\tilde{p}} \in \{4,5,6,7\} \text{ and } \tilde{p} \in \{1,3\} \text{ and for antenna ports are used for SRS transmission} \\ \bar{k}_{TC} & \text{otherwise} \end{cases} \quad \text{[Expression 18]}$$

Here, a period of $k_{TC}^{(p)} \in \{0,1\}$ is determined according to an upper layer UE-specific parameter 'transmissionComb' and configurations of respective aperiodic transmissions is determined according to 'transmissionComb-ap'. $n_b$ refers to a periodic position index. A variable $n_{hf}$ has 0 with respect to the UpPTS in a first half frame of a radio frame and 1 with respect to the UpPTS in a second half frame.

index $n_b$ has a constant value as shown in Expression 19 below as long as not being reconfigured. Here, a period of $n_{RRC}$ is determined according to an upper layer parameter 'freqDomainPosition' and respective configurations of aperiodic transmissions are determined according to 'freqDomainPosition-ap'.

$$n_b = \lfloor 4n_{RRC}/m_{SRS,b} \rfloor \bmod N_b \quad \text{[Expression 19]}$$

On the other hand, when frequency-hopping of an SRS is activated, that is, when $b_{hop} < B_{SRS}$ is satisfied, a frequency position index $n_b$ is defined according to Expressions 20 and 21 below.

$$n_b = \begin{cases} \lfloor 4n_{RRC}/m_{SRS,b} \rfloor \bmod N_b & b \le b_{hop} \\ \{F_b(n_{SRS}) + \lfloor 4n_{RRC}/m_{SRS,b} \rfloor\} \bmod N_b & \text{otherwise} \end{cases} \quad \text{[Expression 20]}$$

Here, $N_b$ is given according to an uplink frequency bandwidth $N_{RB}^{UL}$ as shown in Tables 13 through 16 above.

$$F_b(n_{SRS}) = \begin{cases} (N_b/2)\left\lfloor \frac{n_{SRS} \bmod \prod_{b'=b_{hop}}^{b} N_{b'}}{\prod_{b'=b_{hop}}^{b-1} N_{b'}} \right\rfloor + \left\lfloor \frac{n_{SRS} \bmod \prod_{b'=b_{hop}}^{b} N_{b'}}{2\prod_{b'=b_{hop}}^{b-1} N_{b'}} \right\rfloor & \text{if } N_b \text{ even} \\ \lfloor N_b/2 \rfloor \left\lfloor n_{SRS} / \prod_{b'=b_{hop}}^{b-1} N_{b'} \right\rfloor & \text{if } N_b \text{ odd} \end{cases} \quad \text{[Expression 21]}$$

Here, $N_{b_{hop}} = 1$ is satisfied regardless of $N_b$ as shown in Tables 13 through 16 above.

$n_{SRS}$ is a parameter for calculation of the number times of transmitting a UE-specific SRS and given according to Expression 22 below.

$$n_{SRS} = \begin{cases} 2N_{SP}n_f + 2(N_{SP}-1)\lfloor \frac{n_s}{10} \rfloor + \lfloor \frac{T_{offset}}{T_{offset\_max}} \rfloor, & \text{for 2 ms SRS periodicity of frame structure type 2} \\ \lfloor (n_f \times 10 + \lfloor n_s/2 \rfloor)/T_{SRS} \rfloor, & \text{otherwise} \end{cases} \quad \text{[Expression 22]}$$

Frequency-hopping of an SRS is configured according to a parameter $b_{hop}$ of 0 to 3 that is determined according to an upper layer parameter 'srs-HoppingBandwidth'.

When the frequency-hopping of the SRS is deactivated, that is, when $b_{hop} \ge B_{SRS}$ is satisfied, a frequency position Here, $T_{SRS}$ is a period of transmitting the UE-specific SRS. $T_{offset}$ is an SRS subframe offset and $T_{offset\_max}$ is a maximum of an SRS subframe offset.

In case of all subframes except for a special subframe, an SRS is transmitted in a last symbol of the subframe.

Configuration of a subframe for transmitting an SRS is now described.

A cell-specific subframe configuration period $T_{SFC}$ and a cell-specific subframe offset $\Delta_{SFC}$ for transmitting an SRS are shown according to a frame structure type 1 and a frame structure type 2 in Tables 17 and 18 below, respectively. Here, a parameter 'srs-SubframeConfig' is given via upper layer signaling. An SRS subframes satisfy $\lfloor n_s/2 \rfloor \bmod T_{SFC} \in \Delta_{SFC}$. In case of the frame structure type 2, an SRS is transmitted through a configured uplink subframe or UpPTS only.

Table 17 below shows configuration of an SRS in the frame structure type 1.

TABLE 17

| srs-SubframeConfig | Binary | Configuration Period $T_{SFC}$ (subframes) | Transmission offset $\Delta_{SFC}$ (subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | reserved | reserved |

Table 18 below shows configuration of an SRS in the frame structure type 2.

TABLE 18

| srs-SubframeConfig | Binary | Configuration Period $T_{SFC}$ (subframes) | Transmission offset $\Delta_{SFC}$ (subframes) |
|---|---|---|---|
| 0 | 0000 | 5 | {1} |
| 1 | 0001 | 5 | {1, 2} |
| 2 | 0010 | 5 | {1, 3} |
| 3 | 0011 | 5 | {1, 4} |
| 4 | 0100 | 5 | {1, 2, 3} |
| 5 | 0101 | 5 | {1, 2, 4} |
| 6 | 0110 | 5 | {1, 3, 4} |
| 7 | 0111 | 5 | {1, 2, 3, 4} |
| 8 | 1000 | 10 | {1, 2, 6} |
| 9 | 1001 | 10 | {1, 3, 6} |
| 10 | 1010 | 10 | {1, 6, 7} |
| 11 | 1011 | 10 | {1, 2, 6, 8} |
| 12 | 1100 | 10 | {1, 3, 6, 9} |
| 13 | 1101 | 10 | {1, 4, 6, 7} |
| 14 | 1110 | reserved | reserved |
| 15 | 1111 | reserved | reserved |

3. Carrier Aggregation Environment 3. 1. Overview of Carrier Aggregation

Communication environments considered in embodiments of the present invention include all multi-carrier environments. That is, a multi-carrier system or a multi-carrier aggregation system refers to a system that aggregates one or more component carriers (CCs) each having a smaller bandwidth than a target bandwidth in order to support a wideband in the present invention.

In the present invention, multi-carrier means carrier aggregation (or carrier combining). Carrier aggregation covers aggregation of non-contiguous carriers as well as aggregation of contiguous carriers. In addition, the number of CCs that are aggregated in downlink and uplink may be configured in different ways. A case in which the number of downlink CCs and the number of uplink CCs are the same is referred to as symmetric aggregation, and a case in which the number of downlink CCs and the number of uplink CCs are different is referred to as asymmetric aggregation. The term carrier aggregation is interchangeably used with bandwidth aggregation, spectrum aggregation, etc.

The LTE-A system aims to support a bandwidth of up to 100 MHz by use of multi-carriers (i.e. carrier aggregation) configured by aggregating two or more CCs. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A multi-carrier system of the present invention may support carrier combining (i.e. carrier aggregation) by defining a new bandwidth irrespective of the bandwidths used in the legacy system.

The LTE-A system adopts the concept of a cell to manage radio resources. A cell is defined by combining DL and UL resources, although the UL resources are not a necessity. Accordingly, a cell may be configured with DL resources alone or DL and UL resources. When a specific UE has only one configured serving cell, the cell may have one DL CC and one UL CC. When a specific UE has two or more configured serving cells, the cells may has DL CCs, the number of which is equal to the cells, and UL CCs, the number of which is equal to or less than the DL CCs. On the other hand, DL CCs and UL CCs may be configured in an opposite way. That is, when a specific UE has a plurality of configured serving cells, a carrier aggregation environment in which the number of DL CCs is more than the number of UL CCs may be supported. That is, carrier aggregation is interpreted as aggregation of plural cells having different carrier frequencies (center frequencies of the cells). Here, the term 'cell' used herein needs to be distinguished from a 'cell' as a region covered by a BS.

A cell used in the LTE-A system includes a primary cell (PCell) and a secondary cell (SCell). The PCell and the SCell may be used as serving cells. If the UE is in RRC_CONNECTED state but carrier aggregation has not been configured or is not supported in the UE, only one serving cell including a PCell exists for the UE. On the other hand, if the UE is in RRC_CONNECTED state and carrier aggregation has been configured for the UE, one or more serving cells may exist for the UE. The total serving cells include a PCell and one or more SCells.

The serving cells (the Pcell and the S cell) may be configured via an RRC parameter. PhysCellId is a physical layer ID of a cell and has an integer of 0 to 503. SCellIndex is a short ID used for identifying the S cell and has an integer of 1 to 7. ServCellIndex is a short ID for identifying the serving cell (the P cell or the S cell) and has an integer of 0 to 7. 0 is applied to the P cell and SCellIndex is pre-given so as to be applied to the S cell. That is, a cell having a smallest cell ID (or a cell index) of ServCellIndex is the P cell.

The P cell refers to a cell that operates at a primary frequency (or a primary CC). The P cell may be used to perform an initial connection establishment procedure or a connection reconfiguration procedure via a UE and refer to a cell indicated during a handover procedure. In addition, the P cell is a cell serving as a center of control-related communication among cells configured in a CA environment. That is, a UE may be allocated with a PUCCH only in a P cell of the UE and transmit the PUCCH. In addition, the UE may use only the P cell to acquire system information or change a monitoring procedure. Evolved universal terrestrial radio access (E-UTRAN) may change only the P cell for a handover procedure using an RRCConnectionReconfiguration message of an upper layer, containing mobilityControlInfo in a UE that supports a CA environment.

The S cell may refer to a cell that operates at a secondary frequency (or a secondary CC). Only one P cell may be allocated to a specific UE and one or more S cells may be allocated to the UE. The S cell can be configured after RRC connection is established and used to supply additional radio resources. Among serving cells configured in the CA environment, a PUCCH is not present in cells except for P cells, that is, S cells. When S cells are added to the UE that supports the CA environment, the E-UTRAN may supply all system information related to an operation of a related cell in RRC_CONNECTED state through a dedicated signal. Change in the system information may be controlled according to release and addition of related S cells. In this case, an RRCConnectionReconfigutaion message of an upper layer may be used. The E-UTRAN may perform dedicated signaling with different parameters for respective UEs instead of broadcasting in related S cells.

After an initial security activation procedure is initiated, the E-UTRAN may add one or more S cells to a P cell that is initially configured during a connection establishment procedure to configure a network including one or more S cells. In a CA environment, the P cell and the S cell may act as component carriers. In the following embodiments of the present invention, a primary component carrier (PCC) may have the same meaning as the P cell and a secondary component carrier (SCC) may have the same meaning as the S cell.

Figure 10:
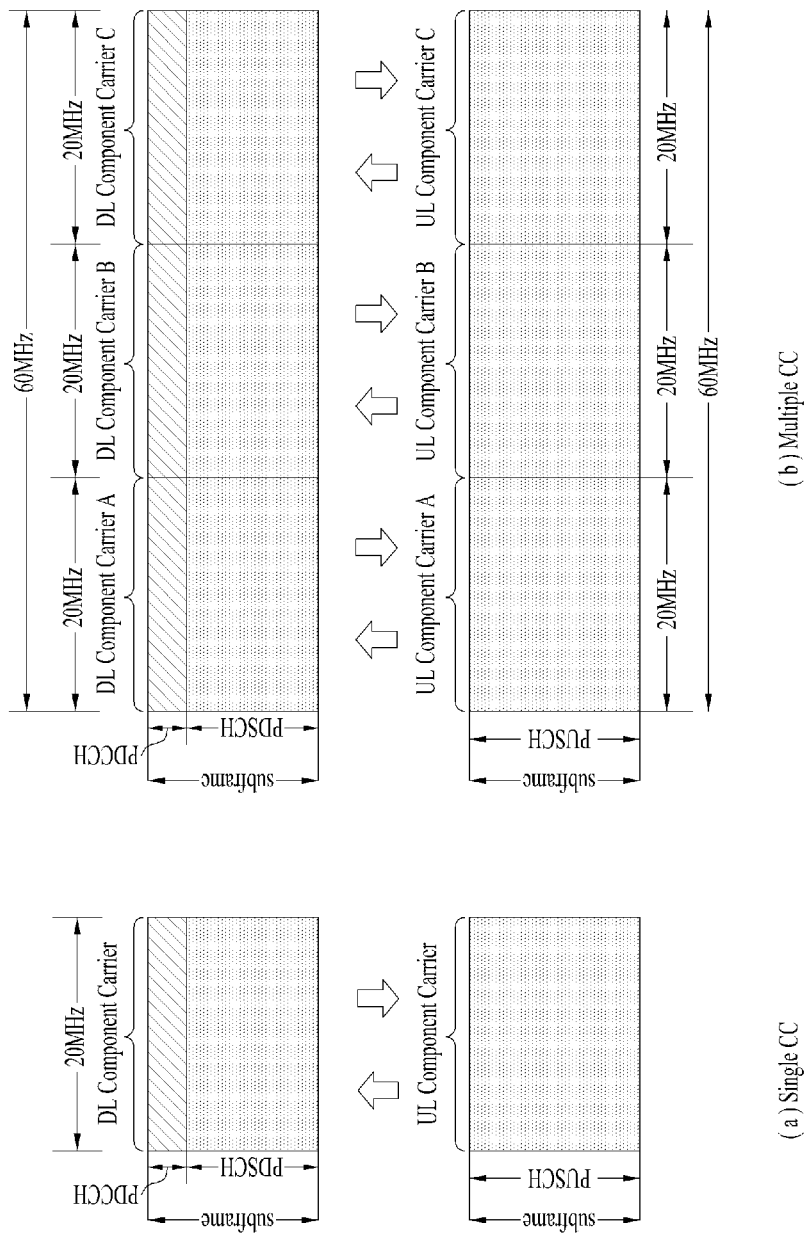
FIG. 10 is a diagram illustrating an example of a component carrier (CC) of an LET system and CA used in an LTE_A system.

FIG. 10 is a diagram illustrating an example of a component carrier (CC) of an LET system and CA used in an LTE_A system.

FIG. 10(a) illustrates a single carrier structure used in the LTE system. The CC includes a downlink component carrier (DL CC) and uplink component carrier (UL CC). One CC may have a frequency range of 20 MHz.

FIG. 10(b) illustrates a CA structure used in the LTE_A system. FIG. 10(b) illustrates a case in which three CCs with a frequency of 20 MHz are combined. Although three DL CCs and three UL CCs are illustrated, the number of the DL CCs and UL CCs are not limited. In case of CA, a UE may simultaneously monitor three CCs, receive downlink signals/data, and transmit uplink signals/data.

When N DL CCs are managed in a specific cell, a network may allocate M (M≤N) DL CCs to a UE. In this case, the UE may monitor only the M limited DL CCs and receive a DL signal. In addition, the network may apply priority L (L≤M≤N) DL CCs to allocate a primary DL CC to the UE. In this case, the UE should monitor L DL CCs. This manner may be applied to uplink transmission in the same way.

The linkage between the carrier frequency of DL resources (or a DL CC) and the carrier frequency of UL resources (or a UL CC) may be indicated by system information or an upper layer message such as an RRC message. For example, a combination of DL resources and UL resources may be configured by the linkage defined by a system information block type 2 (SIB2). In detail, the linkage may refer to a mapping relationship between DL CC for transmission of PDCCH for carrying UL grant and UL CC using the UL grant or a mapping relationship between DL CC (or UL CC) for transmission of data for HARQ and UL CC (or DL CC) for transmission of an HARQ ACK/NACK signal.

3. 2. Cross Carrier Scheduling

In a CA system, from a point of view of scheduling on a serving cell or carrier, there are two methods, i.e., self-scheduling and cross carrier scheduling. The cross carrier scheduling may refer to cross component carrier scheduling or cross cell scheduling.

The self-scheduling refers to transmission of PDCCH (DL grant) and PDSCH via the same DL CC or transmission of PUSCH, transmitted on PDCCH (UL grant) transmitted via DL CC, via UL CC linked with DL CC for reception of UL grant.

The cross carrier scheduling refers to transmission of a PDCCH (DL grant) and PDSCH via different DL CCs or transmission of a PUSCH, transmitted on a PDCCH (UL grant) transmitted via a DL CC, via a UL CC that is not an UL CC linked with DL CC for reception of UL grant.

Whether to perform the cross carrier scheduling may be activated or deactivated UE-specifically or semi-statically known for each respective UE via upper layer signaling (e.g., RRC signaling).

When the cross carrier scheduling is activated, a PDCCH requires a carrier indicator field (CIF) indicating DL/UL CC for transmission of PDSCH/PUSCH indicated by the corresponding PDCCH. For example, the PDCCH may allocate PDSCH resources or PUSCH resources to one of a plurality of CCs using the CIF. That is, when the PDSCH or PUSCH resources are allocated to one of DL/UL CC via which PDCCH on DL CC is multiple-aggregated, the CIF is configured. In this case, a DCI format of Rel-8 may be extended according to the CIF. In this cast, the configured CIF may be fixed to a 3 bit field or fixed regardless of a DCI format size. In addition, a Rel-8 PDCCH structure (the same coding and same CCE-based resource mapping) may be reused.

On the other hand, when a PDCCH on a DL CC allocates PDSCH resources on the same DL CC or allocates PUSCH resources on single-linked UL CC, the CIF is not configured. In this case, the same PDCCH structure (the same coding and same CCE-based resource mapping) and the same DCI format as Rel-8 may be used.

When the cross carrier scheduling is possible, the UE needs to monitor a PDCCH of a plurality of DCIs in a control region of monitoring CC according to a transmission mode and/or bandwidth for each respective CC. Thus, PDCCH monitoring and configuration of a search space for supporting this are required.

In a multiple carrier system, a UE DL CC set is a set of DL CCs scheduled such that the UE receives a PDSCH and a UE UL CC set is a set of UL CCs scheduled such that the UE transmits a PUSCH. In addition, a PDCCH monitoring set is a set of at least one DL CC that performs the PDCCH monitoring. A PDCCH monitoring set may be the same as a UE DL CC or a subset of the UE DL CC set. The PDCCH monitoring set may include at least one of DL CCs in the UE DL CC set. Alternatively, the PDCCH monitoring set may be defined regardless of the UE DL CC set. A DL CC included in the PDCCH monitoring set may be configured such that self-scheduling with respect to UL CC linked with the DL CC is always possible. The UE DL CC set, the UE UL CC set, and the PDCCH monitoring set may be set UE-specifically, UE group-specifically, or cell-specifically.

When the cross component carrier scheduling is deactivated, the PDCCH monitoring set is always the same as the UE DL CC set. In this case, indication such as separate signaling with respect to the PDCCH monitoring set is not required. However, when the cross component carrier scheduling is activated, it is preferable that the PDCCH monitoring set is defined in the UE DL CC set. That is, in order to schedule a PDSCH or PUSCH for a UE, a BS transmits a PDCCH via the PDCCH monitoring set only.

Figure 11:
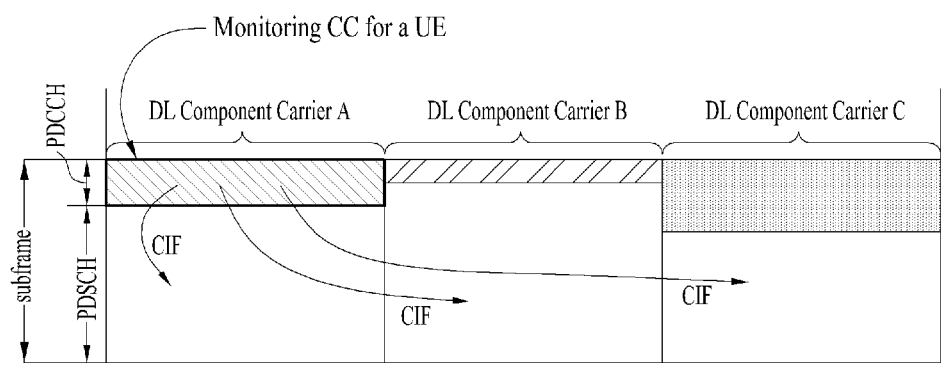
FIG. 11 illustrates a subframe structure of an LTE-A system according to cross carrier scheduling.

FIG. 11 illustrates a subframe structure of an LTE-A system according to cross carrier scheduling.

Referring to FIG. 11, a DL subframe for an LTE-A UE is formed by combining three DL CCs and a DL CC 'A' is configured as a PDCCH monitoring DL CC. When a CIF is not used, each DL CC may transmit a PDCCH for scheduling a PDSCH thereof without a CIF. On the other hand, when the CIF is used via upper layer signaling, only one DL CC 'A' may transmit a PDSCH thereof or a PDCCH for scheduling a PDSCH of another CC using a CIF. In this case, DL CCs 'B' and 'C' that are not configured as a PDCCH monitoring DL CC do not transmit PDCCH.

4. Method of Transmitting Beacon Reference Signal (RS)

When a UE moves at high speed, Doppler broadening is greatly applied. Doppler broadening leads to broadening in a frequency domain, resulting in signal distortion, which may be represented according to Expression 23 below.

$$Ts > Tc \qquad \text{[Expression 23]}$$

Here, Ts refers to a symbol period of a transmission signal or a transmission interval of an RS and Tc refers to coherence time. The coherence time refers to duration when a correlation value of a channel response in a time domain is maintained in 50% or 90% or more.

As described above, a UE may insert a DMRS into an uplink SC-FDMA symbol and transmit the uplink SC-FDMA symbol to a BS. Then, the BS may perform channel estimation on a PUSCH transmitted from the UE. In this case, a precoding matrix used in the PUSCH is applied to the DMRS for MIMO transmission and the BS can perform channel estimation without information of the precoding matrix. The estimated channel may be generally referred to as an equivalent channel in the form of H·W of multiplication of a precoding matrix W and a channel H on which a signal transmitted from the UE passes in reality and act as a PUSCH channel equalizer. However, as described above, when the UE moves at high speed, coherence time is reduced compared with a case of low speed and seriously becomes shorter than a transmission period of the DMRS. Thus, when only the DMRS is used, channel estimation performance cannot be ensured. Accordingly, there is a need for an additional channel estimation method or a transmission method with a short transmission period of a DMRS in a high speed environment.

The present invention proposes a method for improving the channel estimation performance in the high speed environment by inserting a new RS instead of an SRS into an SRS transmission region or modifying or reusing the SRS to generate a beacon RS.

Figure 12:
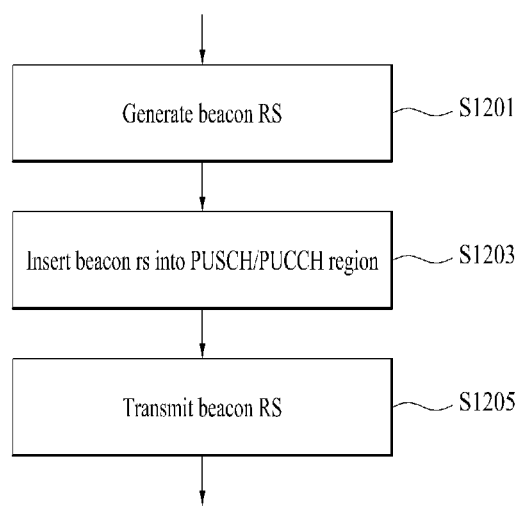
FIG. 12 is a flowchart of a method of transmitting a beacon RS by a UE according to an embodiment of the present invention.

FIG. 12 is a flowchart of a method of transmitting a beacon RS by a UE according to an embodiment of the present invention.

Referring to FIG. 12, for accurate channel estimation or compensation of a BS with respect to the UE, the UE generates the beacon RS (S1201). In this case, the UE may generate the beacon RS using a DMRS or generate the beacon RS by modifying or using an SRS. The generation of the beacon RS by the UE will be described in detail later. In addition, the UE may generate the beacon RS only when mobility speed of the UE is a threshold value or more after the UE detects the mobility speed.

The UE that generates the beacon RS additionally inserts the generated beacon RS into a last symbol (a region in which the SRS is transmitted) of a subframe of a frequency domain of a PUSCH or a frequency domain of a PUCCH (S1203). Then, the UE transmits the beacon RS inserted into the PUSCH or PUCCH transmission region to the BS together with an existing RS (S1205). The UE may additionally insert the beacon RS separately from the existing transmitted RS signal so as to transmit more number of RSs in a time domain than in a conventional case. Thus, since an interval between RSs used for channel estimation is reduced compared with the coherence time, the BS can estimate/compensate accurate channel information with respect to a UE that moves at high speed, resulting in effective rank adaptation.

Hereinafter, a method of generating a beacon RS and transmitting the beacon RS to a BS by a UE will be described. The UE may generate the beacon RS using one or more methods among methods that will be described below.

4. 1. Generation of Beacon RS using DMRS
4. 1. 1. Insertion of Beacon RS into PUSCH Region
4. 1. 1. 1. Beacon RS Generation A UE may generate a beacon RS using a DMRS used in a PUSCH region and map the generated beacon RS to a frequency domain in which PUSCH is transmitted.

The DMRS of PUSCH is generated according to Expression 24 below.

$$r^{PUSCH}(m \cdot M_{sc}^{RS}+n)=r_{u,v}^{(\alpha)}(n) \qquad \text{[Expression 24]}$$

Here, $r_{u,v}^{(\alpha)}(n)$ is generated in different ways according to a size of a resource block (RB) to which PUSCH is allocated. For example, in case of three or more RBs, $r_{u,v}^{(\alpha)}(n)$ may be generated using Zadoff-chu sequence. In case of one or two RBs, $r_{u,v}^{(\alpha)}(n)$ is generated using a preset sequence. Cyclic shift or orthogonal cover code (OCC) calculation is performed on the generated $r_{u,v}^{(\alpha)}(n)$ so as to independently acquire channels of respective UE during MU-MIMO.

A cyclic shift degree α may be defined according to Expression 25 below.

$$\alpha = 2\pi \frac{n_{cs}}{12} \qquad \text{[Expression 25]}$$

Here, $n_{cs}$ for determining α is defined according to Expression 26 below.

$$n_{cs}=(n_{DMRS}^{(1)}+n_{DMRS}^{(2)}+n_{PRS}(n_s))\bmod 12 \qquad \text{[Expression 26]}$$

Here, $n_{DMRS}^{(1)}$ and $n_{DMRS}^{(2)}$ are determined using an upper layer signal and a DMRS field value of an uplink DCI format, respectively. However, a third parameter $n_{PRS}(n_s)$ is generated using a pseudo-random code as a slot unit. Thus, a DMRS in a PUSCH region may have different cyclic shift values as a time slot unit.

When an upper layer parameter 'Activate-DMRS-with OCC' is set, a DMRS in each slot is multiplied by the orthogonal cover code (OCC) and transmitted. The OCC is generated in association with the DMRS field of the uplink DCI format as shown in Table 19 below.

Table 19 below shows a mapping relationship between an OCC and $n_{DMRS}^{(2)}$ according to the DMRS field in the uplink DCI format.

TABLE 19

| Cyclic Shift Field in uplink-related DCI format [3] | $n_{DMRS,\lambda}^{(2)}$ | | | | $[W^{(\lambda)}(0)\ W^{(\lambda)}(1)]$ | | | |
|---|---|---|---|---|---|---|---|---|
| | $\lambda=0$ | $\lambda=1$ | $\lambda=2$ | $\lambda=3$ | $\lambda=0$ | $\lambda=1$ | $\lambda=2$ | $\lambda=3$ |
| 000 | 0 | 6 | 3 | 9 | [1 1] | [1 1] | [1 −1] | [1 −1] |
| 001 | 6 | 0 | 9 | 3 | [1 −1] | [1 −1] | [1 1] | [1 1] |
| 010 | 3 | 9 | 6 | 0 | [1 −1] | [1 −1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 −1] | [1 −1] | [1 −1] | [1 −1] |
| 110 | 10 | 4 | 1 | 7 | [1 −1] | [1 −1] | [1 −1] | [1 −1] |
| 111 | 9 | 3 | 0 | 6 | [1 1] | [1 1] | [1 −1] | [1 −1] |

The above generated DMRS is allocated to a fourth SC-FDMA symbol in case of a normal CP and allocated to a third SC-FDMA symbol in case of an extended CP via the same calculation as a precoding matrix calculation used in a PUSCH. The precoding calculation may be defined using the number of antenna ports and layers according to Expression 27 below.

$$\begin{bmatrix} \tilde{r}_{PUSCH}^{(0)} \\ \vdots \\ \tilde{r}_{PUSCH}^{(P-1)} \end{bmatrix} = W \begin{bmatrix} r_{PUSCH}^{(0)} \\ \vdots \\ r_{PUSCH}^{(v-1)} \end{bmatrix} \quad \text{[Expression 27]}$$

Here, P refers to the number of antenna ports and v refers to the number of layers.

4. 1. 1. 2. Orthogonal Cover Code (OCC)

The DMRS generated using the aforementioned method has different cyclic shift value and OCC values for respective slots. In this case, in order to generate a beacon RS, a cyclic shift value and OCC value used in a first or second slot may be used or a new cyclic shift value and OCC value may be used.

In this case, a slot of the cyclic shift value and OCC value used by the UE may be permanently fixed from a cell or network point of view. Alternatively, the BS may dynamically indicate the slot to the UE via an upper layer signal or a DCI format of PDCCH and indicate corresponding information to the UE using the upper layer signal or the DCI format of PDCCH in order to allocate the new cyclic shift value and OCC value.

The beacon RS is additionally inserted into the PUSCH region and transmitted and thus the number of RSs in one subframe is increased to three from two. When an OCC is applied, a new OCC with a sequence length of 3 may be applied instead of a conventional OCC with a sequence length of 2.

Table 25 below shows an example of an OCC with a length of 3. However, the OCC with a length of 3 may be configured as shown in Table 25 below but is purely exemplary. The OCC may be generated using Hadamard code or a DFT sequence having different phase rotations.

TABLE 25

| Sequence index | Orthogonal sequences |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

4. 1. 1. 3. Precoding Calculation

In order to perform precoding calculation on a beacon RS, a UE may use a precoding matrix used for PUSCH transmission. In this case, implicitly, rank applied to a beacon RS (e.g., an SRS) may also comply with a PUSCH and a DMRS, which may be determined according to PMI information or rank information given in an uplink DCI format.

In addition, the UE may apply a new precoding matrix in a codebook shown in Tables 20 through 24 below instead of a precoding matrix applied to the PUSCH during the precoding calculation. In addition, the BS may indicate a corresponding precoding matrix index to the UE via an upper layer signal or a DCI format of PDCCH. In addition, the UE may transmit a beacon RS without the precoding calculation.

Table 20 below shows a codebook for transmission using two antenna ports.

TABLE 20

| Codebook index | Number of layers | |
|---|---|---|
| | $v=1$ | $v=2$ |
| 0 | $\frac{1}{\sqrt{2}}\begin{bmatrix}1\\1\end{bmatrix}$ | $\frac{1}{\sqrt{2}}\begin{bmatrix}1&0\\0&1\end{bmatrix}$ |
| 1 | $\frac{1}{\sqrt{2}}\begin{bmatrix}1\\-1\end{bmatrix}$ | — |
| 2 | $\frac{1}{\sqrt{2}}\begin{bmatrix}1\\j\end{bmatrix}$ | — |
| 3 | $\frac{1}{\sqrt{2}}\begin{bmatrix}1\\-j\end{bmatrix}$ | — |
| 4 | $\frac{1}{\sqrt{2}}\begin{bmatrix}1\\0\end{bmatrix}$ | — |
| 5 | $\frac{1}{\sqrt{2}}\begin{bmatrix}0\\1\end{bmatrix}$ | — |

Table 21 below shows a codebook for transmission using four antenna ports when the number of layers is 1.

TABLE 21

| Codebook index | Number of layers $v=1$ |
|---|---|
| 0-7 | $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ $\frac{1}{2}\begin{bmatrix}1\\j\\1\\j\end{bmatrix}$ $\frac{1}{2}\begin{bmatrix}1\\j\\j\\1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ |

TABLE 21-continued

| Codebook index | Number of layers υ = 1 |
|---|---|
| 8-15 | $\frac{1}{2}\begin{bmatrix}1\\-1\\1\\1\end{bmatrix}$ $\frac{1}{2}\begin{bmatrix}1\\-1\\j\\-j\end{bmatrix}$ $\frac{1}{2}\begin{bmatrix}1\\-1\\-1\\-1\end{bmatrix}$ $\frac{1}{2}\begin{bmatrix}1\\-1\\-j\\j\end{bmatrix}$ $\frac{1}{2}\begin{bmatrix}1\\-j\\1\\-j\end{bmatrix}$ $\frac{1}{2}\begin{bmatrix}1\\-j\\j\\-1\end{bmatrix}$ $\frac{1}{2}\begin{bmatrix}1\\-j\\-1\\j\end{bmatrix}$ $\frac{1}{2}\begin{bmatrix}1\\-j\\-j\\1\end{bmatrix}$ |
| 16-23 | $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ |

Table 22 below shows a codebook for transmission using four antenna ports when the number of layers is 2.

TABLE 22

| Codebook index | Number of layers υ = 2 |
|---|---|
| 0-3 | $\frac{1}{2}\begin{bmatrix}1&0\\1&0\\0&1\\0&-j\end{bmatrix}$ $\frac{1}{2}\begin{bmatrix}1&0\\1&0\\0&1\\0&j\end{bmatrix}$ $\frac{1}{2}\begin{bmatrix}1&0\\-j&0\\0&1\\0&1\end{bmatrix}$ $\frac{1}{2}\begin{bmatrix}1&0\\-j&0\\0&1\\0&-1\end{bmatrix}$ |
| 4-7 | $\frac{1}{2}\begin{bmatrix}1&0\\-1&0\\0&1\\0&-j\end{bmatrix}$ $\frac{1}{2}\begin{bmatrix}1&0\\-1&0\\0&1\\0&j\end{bmatrix}$ $\frac{1}{2}\begin{bmatrix}1&0\\j&0\\0&1\\0&1\end{bmatrix}$ $\frac{1}{2}\begin{bmatrix}1&0\\j&0\\0&1\\0&-1\end{bmatrix}$ |
| 8-11 | $\frac{1}{2}\begin{bmatrix}1&0\\0&1\\1&0\\0&1\end{bmatrix}$ $\frac{1}{2}\begin{bmatrix}1&0\\0&1\\1&0\\0&-1\end{bmatrix}$ $\frac{1}{2}\begin{bmatrix}1&0\\0&1\\-1&0\\0&1\end{bmatrix}$ $\frac{1}{2}\begin{bmatrix}1&0\\0&1\\-1&0\\0&-1\end{bmatrix}$ |
| 12-15 | $\frac{1}{2}\begin{bmatrix}1&0\\0&1\\0&1\\1&0\end{bmatrix}$ $\frac{1}{2}\begin{bmatrix}1&0\\0&1\\0&-1\\1&0\end{bmatrix}$ $\frac{1}{2}\begin{bmatrix}1&0\\0&1\\0&1\\-1&0\end{bmatrix}$ $\frac{1}{2}\begin{bmatrix}1&0\\0&1\\0&-1\\-1&0\end{bmatrix}$ |

Table 23 below shows a codebook for transmission using four antenna ports when the number of layers is 3.

TABLE 23

| Codebook index | Number of layers υ = 3 |
|---|---|
| 0-3 | $\frac{1}{2}\begin{bmatrix}1&0&0\\1&0&0\\0&1&0\\0&0&1\end{bmatrix}$ $\frac{1}{2}\begin{bmatrix}1&0&0\\-1&0&0\\0&1&0\\0&0&1\end{bmatrix}$ $\frac{1}{2}\begin{bmatrix}1&0&0\\0&1&0\\1&0&0\\0&0&1\end{bmatrix}$ $\frac{1}{2}\begin{bmatrix}1&0&0\\0&1&0\\-1&0&0\\0&0&1\end{bmatrix}$ |
| 4-7 | $\frac{1}{2}\begin{bmatrix}1&0&0\\0&1&0\\0&0&1\\1&0&0\end{bmatrix}$ $\frac{1}{2}\begin{bmatrix}1&0&0\\0&1&0\\0&0&1\\-1&0&0\end{bmatrix}$ $\frac{1}{2}\begin{bmatrix}0&1&0\\1&0&0\\1&0&0\\0&0&1\end{bmatrix}$ $\frac{1}{2}\begin{bmatrix}0&1&0\\1&0&0\\-1&0&0\\0&0&1\end{bmatrix}$ |
| 8-11 | $\frac{1}{2}\begin{bmatrix}0&1&0\\1&0&0\\0&0&1\\1&0&0\end{bmatrix}$ $\frac{1}{2}\begin{bmatrix}0&1&0\\1&0&0\\0&0&1\\-1&0&0\end{bmatrix}$ $\frac{1}{2}\begin{bmatrix}0&1&0\\0&0&1\\1&0&0\\1&0&0\end{bmatrix}$ $\frac{1}{2}\begin{bmatrix}0&1&0\\0&0&1\\1&0&0\\-1&0&0\end{bmatrix}$ |

Table 24 below shows a codebook for transmission using four antenna ports when the number of layers is 3.

TABLE 24

| Codebook index | Number of layers υ = 4 |
|---|---|
| 0 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ |

4. 1. 1. 4. Mapping to Physical Resources

A beacon RS can be allocated to the same frequency domain as in a PUSCH. Thus, a BS may estimate/compensate an equivalent channel using a DMRS and the beacon RS without information regarding a precoding matrix used by a UE. When the beacon RS is used, rate-matching or puncturing may be performed on the PUSCH at a position where a beacon RS symbol (e.g., an SRS symbol position) is transmitted.

Figure 13:
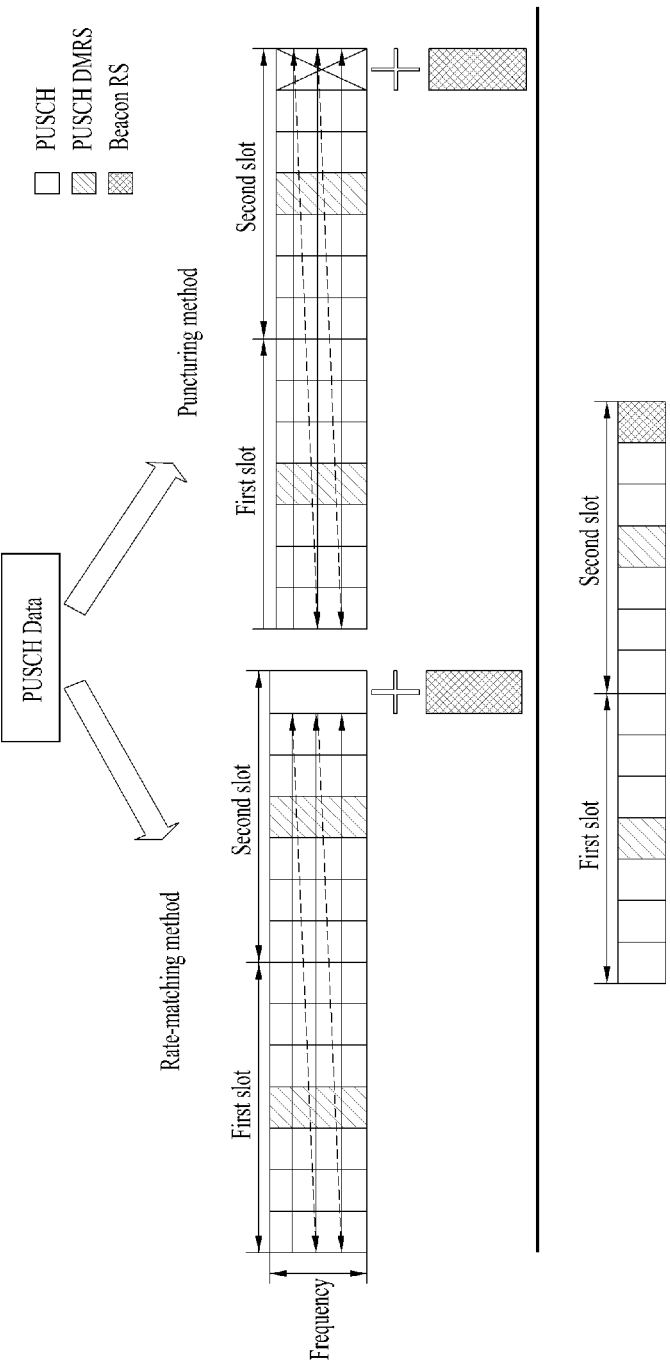
FIG. 13 is a diagram of an example of rate-matching or puncturing for transmitting a beacon RS to a PUSCH region according to an embodiment of the present invention.

FIG. 13 is a diagram of an example of rate-matching or puncturing for transmitting a beacon RS to a PUSCH region according to an embodiment of the present invention.

Referring to FIG. 13, in case of the PUSCH, data resources are preferentially mapped (or allocated) to a time domain and then mapped (or allocated) to a frequency domain. Thus, when the rate matching is used, the UE maps (or allocates) data resources up to $13^{th}$ SC-FDMA and then maps (or allocates) data resources to a sub-carrier. Then, the UE allocates a beacon RS to a $14^{th}$ SC-FDMA symbol and transmits the beacon RS to the BS.

When the puncturing is used, although the conventional data resource allocation scheme of a PUSCH without transmission of an SRS may be used in the same way, the UE may perform the puncturing on data resources allocated to a symbol (a $14^{th}$ SC-FDMA symbol) to which a beacon RS is to be transmitted, insert the beacon RS into the data resources, and then transmit the data resources.

4. 1. 1. 5. Change in Position of DMRS

When a beacon RS is used, a position of a DRMS may be changed and transmitted in order to maintain an effective interval (or an equal interval) of an RS, as illustrated in FIG. 9.

Figure 14:
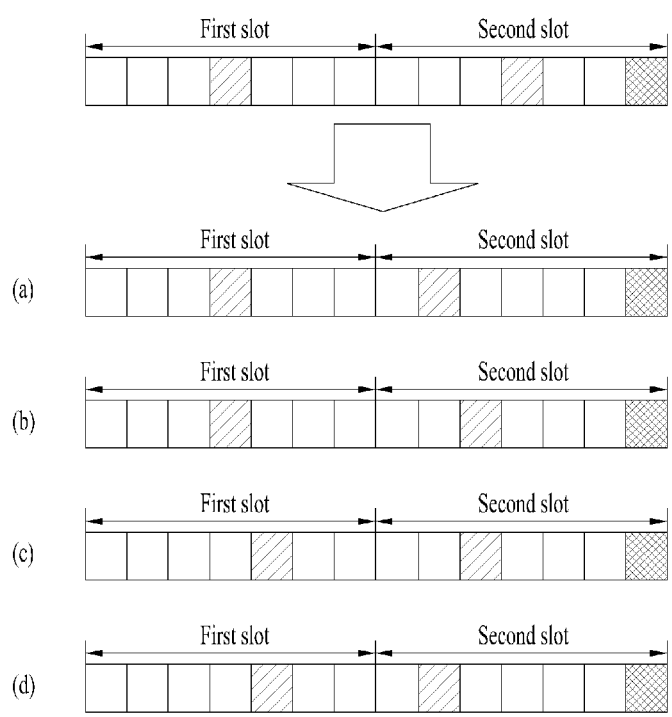
FIG. 14 is a diagram of an example of a position where an RS is transmitted in case of a normal CP according to an embodiment of the present invention.

FIG. 14 is a diagram of an example of a position where an RS is transmitted in case of a normal CP according to an embodiment of the present invention.

Referring to FIG. 14, a UE may change any one or all of positions where a DMRS transmitted in a first or second slot is transmitted. FIG. 14 illustrates an example of changing a position where the DMRS is transmitted in case of a normal CP. As illustrated in FIG. 14, in case of an extended CP, an interval at which a DMRS is transmitted may also be effectively (equally) changed.

4. 1. 2. Insertion of Beacon RS to PUCCH Region

When a UE simultaneously transmits PUCCH formats 1, 1a, and 1b and an SRS, if the UE receive a message indicating transmission of a beacon RS from a BS, the UE may also transmit the beacon RS instead of the SRS. In addition, in case of PUCCH formats 2, 2a, 2b, and 3 as well as the aforementioned PUCCH formats 1, 1a, and 1b, the beacon RS may also be transmitted using rate-matching or puncturing. The beacon RS may be configured in the same way as a DMRS in a PUCCH region. In addition, a turn of a DMRS in one subframe by which the beacon RS is configured may be permanently fixed or dynamically indicated to the UE in the same way as the method of generating a beacon RS of the PUSCH, described in (4. 1. 1). In addition, since the beacon RS has the same sequence length as the DMRS in the PUCCH, it is possible to allocate the beacon RS to the same frequency domain as the PUCCH. Thus, the BS may more accurately estimate/compensate a channel using the DRS and the beacon RS.

4. 2. Generation of Beacon RS using SRS

When a beacon signal is inserted into PUSCH and PUCCH regions, a beacon signal may be generated by manipulating or using or an SRS without a DMRS used in each region, unlike in the aforementioned methods.

4. 2. 1. Configuration of New SRS Bandwidth

In order to use an existing SRS as a beacon RS, new SRS bandwidth configuration may be defined so as to allocate the SRS by as much as the same frequency allocation positions and regions as a PUSCH or a PUCCH. That is, when the BS transmits an indication or trigger message indicating the beacon RS to the UE, the UE that receives the corresponding message transmits the SRS by as much as the same frequency allocation position and the same frequency allocation region as the PUSCH or PUCCH transmitted in a corresponding subframe so as to allow the BS to more accurately estimate/compensate a channel.

Figure 15:
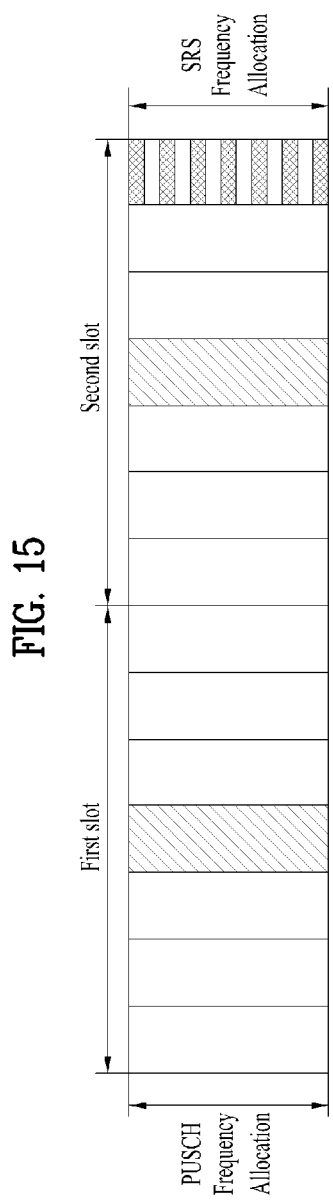
FIG. 15 is a diagram illustrating an example of a beacon RS when transmission bands of a PUSCH and an SRS correspond to each other, according to an embodiment of the present invention.

FIG. 15 is a diagram illustrating an example of a beacon RS when transmission bands of a PUSCH and an SRS correspond to each other, according to an embodiment of the present invention.

Referring to FIG. 15, a UE may generate the beacon RS using the SRS by allocating a frequency band for transmission of the SRS so as to correspond to a frequency band to which the PUSCH is allocated. In this case, the SRS may be transmitted in the form in which subcarriers are interleaved in a frequency domain at two space intervals.

4. 2. 2. Modification of Bandwidth of SRS

Unlike in the above description, a frequency allocation region for transmission of an SRS may be allocated so as to contain a frequency allocation region for transmission of a PUSCH or a PUCCH using conventional SRS bandwidth configuration without definition of new SRS bandwidth configuration. That is, when a BS transmits an indication or trigger message indicating the beacon RS to the UE, the UE that receives the corresponding message transmits the SRS so as to contain a frequency allocation region to which a PUSCH or PUCCH transmitted in a corresponding subframe is allocated. In this case, the BS may explicitly indicate a frequency allocation position and region of the SRS to the UE using a conventional method of transmitting an SRS. In addition, the UE that receives the indication or trigger message indicating the beacon RS may implicitly transmit the beacon RS using configuration of SRS bandwidth including a frequency allocation region for transmission of a PUSCH or a PUCCH.

Figure 16:
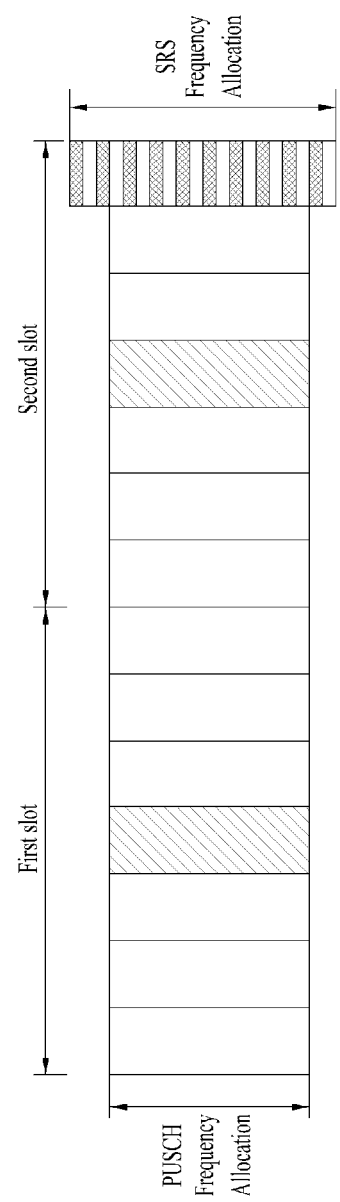
FIG. 16 is a diagram illustrating an example of a beacon RS when transmission bands of a PUSCH and an SRS do not correspond to each other, according to an embodiment of the present invention.

FIG. 16 is a diagram illustrating an example of a beacon RS when transmission bands of a PUSCH and an SRS do not correspond to each other, according to an embodiment of the present invention.

Referring to FIG. 16, a UE may generate the beacon RS by allocating a frequency band for transmission of the SRS so as to contain a frequency band to which a PUSCH is allocated. In this case, the SRS may be transmitted in the form in which subcarriers are interleaved in a frequency domain at two space intervals.

As the SRS containing the frequency allocation region for transmission of the PUSCH or PUCCH, an SRS that occupies a smallest RB may be selected. In addition, the BS may previously indicate SRS bandwidth configuration to the UE via upper layer signaling.

As described in (4. 2. 1.) and (4. 2. 2.), the BS may transmit an indication or trigger message indicating the beacon RS to a transmission region of the SRS. In this case, the used message may be transmitted via an upper layer signal or a DCI format in a PDCCH. In particular, when the DCI format in the PDCCH is used, whether the beacon RS is applied may be indicated or triggered via control information of x or more bits (x>=1) in the DCI. In case of a CA system, during configuration of an indication or trigger message, the BS may use bits by as much as n (the number of configured cells) times of a case in which a message is transmitted in a single cell such that the UE independently transmits the beacon RS to each cell. In addition, the BS may bind a predetermined number of configured cells as a set to constitute a bit. Thus, the UE that that receives an indication or trigger message indicating the beacon RS may transmit the beacon RS to a configured cell belonging to the set.

5. Overview of Device According to an Embodiment of the Present Invention

Figure 17:
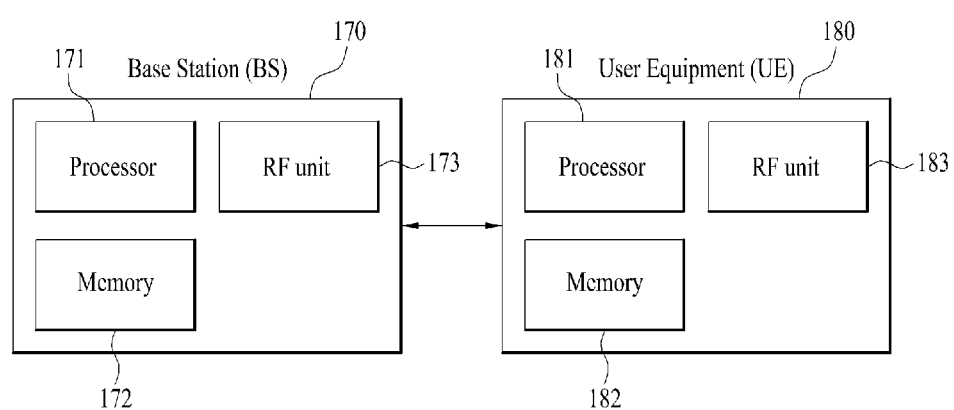
FIG. 17 is a block diagram of a communication device according to an embodiment of the present invention.

FIG. 17 is a block diagram of a communication device according to an embodiment of the present invention.

Referring to FIG. 17, a wireless communication system includes a BS 170 and a plurality of UEs 180 positioned in an area of the BS 170.

The BS 170 includes a processor 171, a memory 172, and a radio frequency (RF) unit 173. The processor 171 embodies the proposed functions, procedures, and/or methods. Layers of a wireless interface protocol may be embodied by the processor 171. The memory 172 is connected to the processor 171 and stores various information for driving the processor 171. The RF unit 173 is connected to the processor 171 and transmits and/or receives a radio signal.

The UE 180 includes a processor 181, a memory 182, and an RF unit 183. The processor 181 embodies the proposed functions, procedures, and/or methods. Layers of a wireless interface protocol may be embodied by the processor 181. The memory 182 is connected to the processor 181 and stores various information for driving the processor 181. The RF unit 183 is connected to the processor 181 and transmits and/or receives a radio signal.

The memories 172 and 182 may be inside or outside the processors 171 and 181 and connected to processors 171 and 181 via various well-known means. In addition, the BS 170 and/or the UE 180 may have a single antenna or a multiple antenna.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

Throughout this disclosure, the embodiments of the present invention have been described in terms of a data transmission/reception relationship between a UE and a base station. In this disclosure, the aforementioned operations performed by the base station may be performed by an upper node of the base station depending on cases. In other words, it will be obvious to those skilled in the art that various operations for enabling the base station to communicate with the terminal in a network composed of several network nodes including the base station will be conducted by the base station or other network nodes other than the base station. The term "base station (BS)" may be replaced with a fixed station, Node-B, eNode-B (eNB), or an access point as necessary. The term "relay" may be replaced with the terms relay node (RN) or relay station (RS). The term "terminal" may also be replaced with a user equipment (UE), a mobile station (MS), a mobile subscriber station (MSS) or a subscriber station (SS) as necessary.

The embodiments of the present invention may be achieved by various means, for example, hardware, firmware, software, or a combination thereof. In a hardware configuration, an embodiment of the present invention may be achieved by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is applicable to various wireless access systems other than a 3rd generation partnership project (3GPP) long term evolution (LTE) system although the embodiments of the present invention have been described in terms of an example in which a data transmitting/receiving method is applied to the 3GPP LET system.

The invention claimed is:

1. A method of transmitting an uplink reference signal in a wireless access system, the method performed by a mobile station and comprising:
    comparing a detected mobility speed of the mobile station with a threshold value to obtain a comparison result;
    generating a beacon reference signal using a demodulation reference signal used in a physical uplink shared channel (PUSCH) region, when the comparison result indicates that the detected mobility speed of the mobile station is equal to or greater than the threshold value;
    inserting the generated beacon reference signal, instead of a sounding reference signal (SRS), into a last symbol of a subframe in an uplink frequency domain in which the PUSCH is transmitted; and
    transmitting the inserted beacon reference signal to a base station via a same subframe as the demodulation reference signal, wherein the beacon reference signal is used for an uplink channel estimation of the PUSCH by the base station, together with the demodulation reference signal.

2. The method according to claim 1, wherein the demodulation reference signal is allocated to a first slot of one subframe or a second slot of the one subframe.

3. The method according to claim 1, wherein the generated beacon reference signal is inserted into the last symbol of the subframe by rate-matching or puncturing data resources allocated to the uplink frequency domain when the generated beacon reference signal is inserted into the last symbol of the subframe in the uplink frequency domain.

4. The method according to claim 1, further comprising changing a position of a symbol in which the demodulation reference signal is transmitted.

5. A user equipment (UE) for transmitting an uplink reference signal in a wireless access system, the UE comprising:
   a radio frequency (RF) unit; and
   a processor configured to:
      compare a detected mobility speed of the UE with a threshold value to obtain a comparison result,
      generate a beacon reference signal using a demodulation reference signal used in a physical uplink shared channel (PUSCH) region, when the comparison result indicates that the detected mobility speed of the mobile station is equal to or greater than the threshold value,
      insert the generated beacon reference signal, instead of a sounding reference signal (SRS), into a last symbol of a subframe in an uplink frequency domain in which the PUSCH is transmitted, and
      transmit, via the RF unit, the inserted beacon reference signal to a base station via a same subframe as the demodulation reference signal,
   wherein the beacon reference signal is used for an uplink channel estimation of the PUSCH by the base station, together with the demodulation reference signal.

6. The UE according to claim 5, wherein the demodulation reference signal is allocated to a first slot of one subframe or a second slot of the one subframe.

7. The UE according to claim 5, wherein the processor inserts the generated beacon reference signal into the last symbol of the subframe by rate-matching or puncturing data resources allocated to the uplink frequency domain when the generated beacon reference signal is inserted into the last symbol of the subframe in the uplink frequency domain.

8. The UE according to claim 5, wherein the processor is further configured to change a position of a symbol in which the demodulation reference signal is transmitted.

* * * * *